United States Patent
Luby et al.

(10) Patent No.: US 9,413,494 B2
(45) Date of Patent: Aug. 9, 2016

(54) FEC-BASED RELIABLE TRANSPORT CONTROL PROTOCOLS FOR MULTIPATH STREAMING

(71) Applicant: QUALCOMM Incorporated, San Digo, CA (US)

(72) Inventors: Michael George Luby, Berkely, CA (US); Lorenz Christoph Minder, Evanston, IL (US)

(73) Assignee: QUALCOMM Incorporated, San Diego, CA (US)

( * ) Notice: Subject to any disclaimer, the term of this patent is extended or adjusted under 35 U.S.C. 154(b) by 85 days.

(21) Appl. No.: 14/157,290

(22) Filed: Jan. 16, 2014

(65) Prior Publication Data

US 2014/0201587 A1     Jul. 17, 2014

Related U.S. Application Data

(60) Provisional application No. 61/753,884, filed on Jan. 17, 2013, provisional application No. 61/818,106, filed on May 1, 2013.

(51) Int. Cl.
*H04L 1/00*     (2006.01)
*H04L 1/06*     (2006.01)
(Continued)

(52) U.S. Cl.
CPC ............ *H04L 1/1819* (2013.01); *H04L 1/0002* (2013.01); *H04L 1/0643* (2013.01); *H04L 1/22* (2013.01); *H04L 1/0009* (2013.01); *H04L 2001/0093* (2013.01); *H04N 21/6375* (2013.01)

(58) Field of Classification Search
CPC ....... H04L 1/0045; H04L 1/0643; H04L 1/08; H04L 1/1819; H04L 1/0057; H04L 1/0041; H04L 2001/0093; H04L 1/0083; H04L 1/0002; H04L 1/22; H04L 1/0009; H04N 21/6375
USPC ......................................... 714/751
See application file for complete search history.

(56) References Cited

U.S. PATENT DOCUMENTS

| 5,625,881 A | 4/1997 | Sandler et al. |
| 6,307,487 B1 | 10/2001 | Luby |

(Continued)

FOREIGN PATENT DOCUMENTS

| WO | 2005036361 A2 | 4/2005 |
| WO | 2008005981 A1 | 1/2008 |
| WO | 2012018339 A1 | 2/2012 |

OTHER PUBLICATIONS

Adler, et al., "A Modular Analysis of Network Transmission Protocols," Proceedings of the Fifth Israeli Symposium on Theory of Computing and Systems, Apr. 1997, 17 pp.

(Continued)

*Primary Examiner* — James C Kerveros
(74) *Attorney, Agent, or Firm* — Shumaker & Sieffert, P.A.

(57) ABSTRACT

A client device includes one or more processors configured to receive, from a server device, forward-error corrected data via a plurality of parallel network paths, determine losses of the data over each of the network paths, and send data representing the losses of the data over each of the network paths to the server device. Additionally or alternatively, a client device includes one or more processors configured to receive a first set of encoding units for a first block, wherein the first set of encoding units includes fewer than a minimum number of encoding units needed to recover the first block, after receiving the first set of encoding units, receive a second set of encoding units for a second block, and after receiving the second set of encoding units, receive a third set of encoding units including one or more encoding units for the first block.

23 Claims, 16 Drawing Sheets

(51) Int. Cl.
   *H04L 1/18*    (2006.01)
   *H04L 1/22*    (2006.01)
   *H04N 21/6375* (2011.01)

(56) References Cited

U.S. PATENT DOCUMENTS

| | | | |
|---|---|---|---|
| 6,320,520 B1 | 11/2001 | Luby | |
| 6,373,406 B2 | 4/2002 | Luby | |
| 6,411,233 B1 | 6/2002 | Sutardja | |
| 6,486,803 B1 | 11/2002 | Luby et al. | |
| 6,614,366 B2 | 9/2003 | Luby | |
| 7,158,568 B2 | 1/2007 | Park et al. | |
| 7,447,235 B2 | 11/2008 | Luby et al. | |
| 7,643,480 B2 * | 1/2010 | Liu | H04L 1/0002 370/228 |
| 7,716,560 B1 * | 5/2010 | Sprague et al. | 714/776 |
| 8,023,533 B2 * | 9/2011 | Kure | 370/503 |
| 8,458,567 B2 | 6/2013 | Luby et al. | |
| 9,043,670 B2 * | 5/2015 | Sayadi et al. | 714/758 |
| 2003/0058958 A1 | 3/2003 | Shokrollahi et al. | |
| 2008/0151881 A1 * | 6/2008 | Liu | H04L 1/0002 370/389 |
| 2010/0226243 A1 * | 9/2010 | Lee et al. | 370/216 |
| 2012/0131407 A1 * | 5/2012 | Chiao et al. | 714/751 |
| 2012/0151302 A1 * | 6/2012 | Luby et al. | 714/776 |
| 2012/0207068 A1 | 8/2012 | Watson et al. | |
| 2012/0246538 A1 | 9/2012 | Wu | |
| 2012/0272124 A1 * | 10/2012 | Huang | 714/776 |
| 2013/0195106 A1 | 8/2013 | Calmon et al. | |
| 2014/0201587 A1 * | 7/2014 | Luby et al. | 714/751 |
| 2014/0325302 A1 * | 10/2014 | Lee et al. | 714/751 |
| 2014/0362864 A1 * | 12/2014 | Sugimoto | 370/400 |
| 2015/0095743 A1 * | 4/2015 | Sato | 714/774 |

OTHER PUBLICATIONS

Carle, et al., "Multipath FEC Scheme for the ATM Adaptation Layer AAL5," IFIP - The International Federation for Information Processing, Springer US, Oct. 1998, pp. 234-245.

Cui, et al., "FMTCP: A Fountain Code-Based Multipath Transmission Control Protocol", Distributed Computing Systems (ICDCS) IEEE 32nd International Conference on, IEEE, 18 Jun. 2012, pp. 366-375, XP032217879.

International Search Report and Written Opinion from International Application No. PCT/US2014/011988, dated Apr. 8, 2014, 11 pp.

Second Written Opinion from International Application No. PCT/US2014/011988, dated Dec. 17, 2014, 7 pp.

International Preliminary Report on Patentability from International Application No. PCT/US2014/011988, dated Apr. 21, 2015, 9 pp.

* cited by examiner

Sender data format

Receiver feedback format

Sender data format

Receiver feedback format

FEC-BASED RELIABLE TRANSPORT CONTROL PROTOCOLS FOR MULTIPATH STREAMING

This application claims the benefit of U.S. Provisional Application Ser. No. 61/753,884, filed Jan. 17, 2013, and U.S. Provisional Application Ser. No. 61/818,106, filed May 1, 2013, the entire contents of each of which are hereby incorporated by reference.

TECHNICAL FIELD

This disclosure relates to transport of media data.

BACKGROUND

Devices may perform rapid transmission of data between end systems over a data communication network using multiple paths and low-latency handling. Many data communication systems and high level data communication protocols offer the convenient communication abstractions of reliable data transport, and provide rate control, i.e., they automatically adjust their packet transmission rate based on network conditions. Their traditional underlying implementations in terms of lower level packetized data transports, such as the ubiquitous Transport Control Protocol (TCP), suffer when at least one of the following conditions occurs: (a) the connection between the sender(s) and the receiver(s) has a large round-trip time (RTT); (b) the amount of data is large and the network suffers from bursty and transient losses.

One widely used reliable transport protocol is the Transport Control Protocol (TCP). TCP is a point to point packet control scheme in common use that has an acknowledgment mechanism. TCP works well for one-to-one reliable communications when there is little loss between the sender and the recipient and the RTT between the sender and the recipient is small. However, the throughput of the TCP drops drastically when there is even very little loss, or when there is any significant latency between the sender and the recipient.

Using TCP, a sender transmits ordered packets and the recipient acknowledges receipt of each packet. If a packet is lost, no acknowledgment will be sent to the sender and based on reception of either later received packets or on a timeout the sender will resend the packet. With protocols such as TCP, the acknowledgment paradigm allows packets to be lost without total failure, since lost packets can just be retransmitted, either in response to a lack of acknowledgment or in response to an explicit request from the recipient.

TCP provides both reliability control and rate control. That is, devices implementing TCP ensure that all of the original data is delivered to receivers and automatically adjust the packet transmission rate based on network conditions such as congestion and packet loss. With TCP, the reliability control protocol and the rate control protocol are intertwined and not separable. Moreover, TCP's throughput performance as a function of increasing RTT and packet loss is far from optimal.

SUMMARY

In general, this disclosure describes techniques related to forward-error correction (FEC) applied to data sent over a plurality of parallel network paths. In one example, data may be reliably transported from a sender to a receiver by organizing the data to be transported into data blocks, wherein each data block comprises a plurality of encoding units. The encoding units of a first data block may be transmitted from the sender to the receiver over multiple paths, i.e., some encoding units of the first data block are sent over one path whereas other encoding units of the first data block are sent over a second path, etc. The sender may detect acknowledgments of receipt of encoding units by the receiver. At the sender, a probability that the receiver will receive sufficient encoding units of the first data block from already sent encoding units for the first data block to recover the first data block at the receiver may be detected and the probability may be tested against a threshold probability to determine whether a predetermined test is met. Following the step of testing and prior to the sender receiving confirmation of recovery of the first data block at the receiver, when the predetermined test is met, the sender may transmit encoding units of a second data block from the sender over the multiple paths. In some examples, the sender may send encoding units of the second block before a sufficient number of encoding units have been sent for the first block for the receiver to recover the first block, and thus the sender may send additional encoding units for the first block subsequent to sending at least some encoding units for the second block. Furthermore, the sender may send encoding units of a block to the receiver before the block has been fully formed. In some examples, the predetermined test is a comparison of the probability against the threshold probability and the predetermined test may be determined to be met when the probability is greater than the threshold probability.

In some examples, the sender can also dynamically determine the size or duration of each block as it is generated, determine the rate at which the data in blocks is generated, and determine the rate at which encoding units are sent over each of the multiple paths to the receiver.

In one example, a computer-readable storage medium has stored thereon instructions that, when executed, cause a processor of a client device to receive, from a server device, forward-error corrected data via a plurality of parallel network paths, determine losses of the data over each of the network paths, and send data representing the losses of the data over each of the network paths to the server device.

In another example, a computer-readable storage medium has stored thereon instructions that, when executed, cause a processor of a server device to send, to a client device, forward-error corrected data via a plurality of parallel network paths, receive, from the client device, data representing losses of the data sent over each of the network paths, and modify, based on the data representing the losses, an amount of forward-error correction data sent for subsequent data transmissions over the parallel network paths.

The details of one or more examples are set forth in the accompanying drawings and the description below. Other features, objects, and advantages will be apparent from the description and drawings, and from the claims.

DETAILED DESCRIPTION

Figure 1:
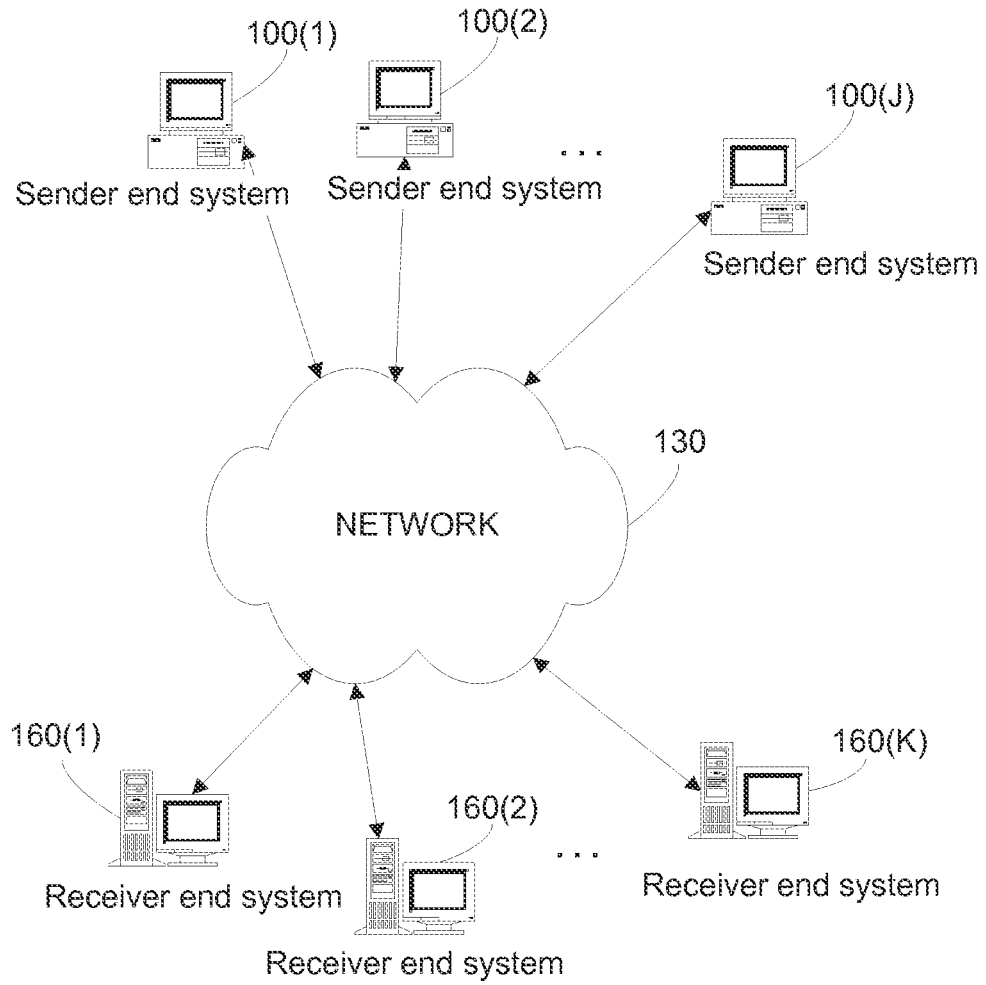
FIG. 1 is a block diagram of an example network, sender end systems, and receiver end systems that may use the teachings of the present disclosure.

Studies by many researchers have shown that, when using TCP, the throughput (in units of packets per second) of the data transfer is inversely proportional to the product of the RTT (in units of seconds), and the square root of the loss rate on the end-to-end connection. For example, a typical end-to-end terrestrial connection between the U.S. and Europe has an RTT of 200 milliseconds and an average packet loss of 2%, and IP packets are typically around 10 Kilobits in size. Under these conditions, the throughput of a TCP connection is at most around 300-400 Kilobits per second (kbps), no matter how much bandwidth is available end-to-end. The situation is more severe on a satellite link, where in addition to high RTTs, information is lost due to various atmospheric effects.

As another example, mobile devices in mobile networks, 3G or LTE networks, are known to experience large RTTs, dynamic fluctuations in RTTs, and dynamic fluctuations in available bandwidth. A mobile device may have these experiences for a variety of reasons, including the changing position of the mobile device within a cell or moving across cell boundaries that can cause fluctuations in coverage, variable loading of the network due to other mobile devices coming close to or moving away from the cell that is providing coverage to the mobile device, and a variety of other reasons. A primary reason for TCP's poor performance in these types of conditions is that the rate control protocol used by TCP does not work well in these conditions, e.g., even if the available bandwidth is high for short periods of time, the TCP protocol may not react fast enough to increase its transmission rate to take advantage of the higher available bandwidth before the available bandwidth decreases again.

Since the reliability control protocol and rate control protocol used by TCP are inseparable, this implies that the overall TCP protocol does not work well in these conditions. One way to attempt to overcome these limitations of TCP is to use multiple TCP connections over separate paths to further increase the aggregate end-to-end throughput. Furthermore, the requirements of different applications for transport vary, yet TCP is used fairly universally for a variety of applications in all network conditions, thus leading to poor performance in many situations.

For example, for a real-time video streaming application, the video may be generated in the field on a mobile device and streamed over multiple TCP connections, over possibly different 3G or 4G/LTE connections, possibly using multiple mobile devices either tethered to or connected by WiFi to the generating mobile device, to a receiving device that is to reconstruct the original video stream. However, due to the fluctuations in available bandwidth and variations in RTTs, these multiple TCP connections may still fail to fully utilize the available bandwidth. For such a streaming application, the end-to-end delay requirements might be quite stringent for a real-time streaming application, and thus there is the further complication and requirement that the stream is comprised of a sequence of blocks of data, and enough encoding units sent over the different TCP connections for each block of data needs to be received to allow reconstruction of that block of data of the stream at the receiving device, and generally the blocks of data are to be consumed or played back at the receiving device in sequence with the smallest possible delay between when each block of data is made available (in part or in whole) at the sender and when the block of data is reconstructed and made available for playback or consumption at the receiving device. These requirements can make the capabilities of a TCP-based solution constrained by the slowest TCP connection, and overall a TCP-based solution may be quite inferior.

This disclosure includes descriptions of improved reliability control and rate control protocols that may be used independently, and the same reliability control protocol can be used with a variety of different rate control protocols so the actual rate control protocol chosen can be based on application requirements and the network conditions in which the application is run. The paper "A Modular Analysis of Network Transmission Protocols", Micah Adler, Yair Bartal, John Byers, Michael Luby, Danny Raz, Proceedings of the Fifth Israeli Symposium on Theory of Computing and Systems, June 1997 (hereinafter referred to as "Adler" and incorporated by reference herein), introduces a modular approach to building transport protocols that advocates partitioning a reliable transport protocol into independent reliability control and rate control protocols.

For any reliability control protocol, two primary measures of its performance are how much buffering is required and its "goodput." Buffering is introduced in a reliability control protocol at both the sender and receiver. Buffering at the sender occurs, for example, when data is buffered after it is initially sent until the sender has an acknowledgement that it has been received at the receiver. Buffering at the receiver occurs for similar reasons. Buffering is of interest for two reasons: (1) it directly impacts how much memory the sender and receiver reliability control protocol uses; (2) it directly impacts how much latency the sender and receiver reliability control protocol introduces. Goodput is defined as the size of the data to be transferred divided by the amount of sent data that is received at the receiver end system during the transfer. For example, goodput=1.0 if the amount of data sent in packets to transfer the original data is the size of the original data, and goodput=1.0 can be achieved if no redundant data is ever transmitted.

Adler outlines a reliability control protocol that is largely independent of the rate control protocol used, which is hereafter referred to as the "No-code reliability control protocol". The No-code reliability control protocol is in some ways similar to the reliability control protocol embedded in TCP, in the sense that the original data is partitioned into blocks and each block is sent in the payload of a packet, and then an exact copy of each block needs to be received to ensure a reliable transfer. An issue with the No-code reliability control protocol is that, although the goodput is optimal (essentially equal to one), the buffering that the No-code reliability control protocol introduces can be substantial when there is packet loss. Adler proves that the No-code reliability control protocol is within a constant factor of optimal among reliability control protocols that do not use coding to transport the data, in the sense that the protocol has optimal goodput and provably is within a constant factor of optimal in terms of minimizing the amount of buffering needed at the sender and receiver.

One technique that has been used in reliability control protocols is Forward Error-Correction (FEC) codes, such as Reed-Solomon codes or Tornado codes, or chain reaction codes (which are information additive codes.) Using FEC codes, the original data is partitioned into blocks larger than the payload of a packet and then encoding units are generated from these blocks and send the encoding units in packets. One basic advantage of this approach versus reliability control protocols that do not use coding is that the feedback can be much simpler and less frequent, i.e., for each block the receiver need only indicate to the sender the quantity of encoding units received instead of a list of exactly which encoding units are received. Furthermore, the ability to generate and send more encoding units in aggregate than the length of the original data block is a powerful tool in the design of reliability control protocols.

Erasure correcting codes, such as Reed-Solomon or Tornado codes, generate a fixed number of encoding units for a fixed length block. For example, for a block comprising B input units, N encoding units might be generated. These N encoding units may comprise the B original input units and N-B redundant units. If storage permits, then the sender can compute the set of encoding units for each block only once and transmit the encoding units using a carousel protocol.

One problem with some FEC codes is that they require excessive computing power or memory to operate. Another problem is that the number of encoding units needed must be determined in advance of the coding process. This can lead to inefficiencies if the loss rate of packets is overestimated, and can lead to failure if the loss rate of packets is underestimated.

For traditional FEC codes, the number of possible encoding units that can be generated is of the same order of magnitude as the number of input units a block is partitioned into. Typically, but not exclusively, most or all of these encoding units are generated in a preprocessing step before the sending step. These encoding units have the property that all the input units can be regenerated from any subset of the encoding units equal in length to the original block or slightly longer in length than the original block.

Chain reaction decoding described in U.S. Pat. No. 6,307,487 (hereinafter "Luby I" and incorporated by reference herein) can provide a form of forward error-correction that addresses the above issues. For chain reaction codes, the pool of possible encoding units that can be generated is orders of magnitude larger than the number of the input units, and a randomly or pseudo randomly selected encoding unit from the pool of possibilities can be generated very quickly. For chain reaction codes, the encoding units can be generated on the fly on an "as needed" basis concurrent with the sending step. Chain reaction codes allow that all input units of the content can be regenerated from a subset of a set of randomly or pseudo randomly generated encoding units slightly longer in length than the original content.

Other documents such as U.S. Pat. Nos. 6,320,520, 6,373,406, 6,614,366, 6,411,223, 6,486,803, and U.S. Patent Publication No. 2003/0058958 (hereafter referred to as "Shokrollahi I"), describe various chain reaction coding schemes and are incorporated herein by reference.

A sender using chain reaction codes can continuously generate encoding units for each block being sent. The encoding units may be transmitted via the User Datagram Protocol (UDP) Unicast, or if applicable UDP Multicast, to the recipients. Each recipient is assumed to be equipped with a decoding unit, which decodes an appropriate number of encoding units received in packets to obtain the original blocks.

An existing simple FEC-based reliability control protocol, hereinafter referred to as the "TF reliability control protocol," transmits encoding units for a given block of data until receiving an acknowledgement from the receiver that enough encoding units have been received to recover the block, and then the sender moves on to the next block.

Let RTT be the number of seconds it would take from when the sender sends a packet until the sender has received an acknowledgement from the receiver that the packet has arrived, and let R be the current sending rate of the sender in units of packets/second, and let B be the size of a block in units of packets. Using the TF reliability control protocol, the number of useless packets containing encoding units for a block sent subsequent to the last packet needed to recover the block is $N=R*RTT$. Thus, a fraction $f=N/(B+N)$ of the packets sent are wasted, and thus the goodput is at most $1-f$. For example, if R=1,000 packets/second, RTT=1 second, and B=3,000 packets, then f=0.25, i.e., 25% of the received packets are wasted. Thus, the goodput in this example is a meager 0.75 (compared to a maximum possible goodput of 1.0).

Note also in this example that the size of a block B together with the rate R implies that the latency introduced by the simple FEC-based reliability control protocol is at least 4 seconds (each block is transmitted for 4 seconds total), and requires buffering at least one block, i.e., 3,000 packets of data. Furthermore, to increase the goodput requires increasing the buffering, or conversely to decrease the buffering requires decreasing the goodput.

U.S. Pat. No. 7,447,235, naming Luby, et al. (hereafter referred to as "Luby II") describes improved FEC-based reliability protocols. However, improved reliability control protocols for streaming over multiple paths are desirable. Furthermore, providing a corresponding rate control protocol that can be combined with improved reliability control protocols to result in a transport protocol suitable for streaming over multiple paths that maximizes reliability and goodput and minimizes end-to-end latency is desirable.

In examples in accordance with this disclosure, interleaved reliability control protocols for multipath transmission may be used to provide improvements over TCP, the TF reliability control protocol and the No-code reliability control protocol, and the FEC-based reliability protocol described in Luby II. Furthermore, improved rate control protocols and generation rate protocols are introduced which can be combined with the improved reliability control protocols to provide a transport protocol suitable for streaming over multiple paths that maximizes reliability and goodput and minimizes end-to-end latency.

With a reliability control protocol, blocks of data are sent as a series of encoding units from a sender to a receiver and the receiver acknowledges recovery of the encoding units or the blocks, thereby allowing the sender to determine whether the receiver received the data and if not received, retransmit the data, or transmit other data usable to recover the received data. One property of some interleaved reliability control protocols is that encoding units for different blocks are sent in an interleaved fashion. Interleaved reliability control protocols have a property that, when combined with virtually any rate control protocol, they provide an efficient reliable data transport that minimizes buffering (and the consequent latency) at the end systems and maximizes the goodput of the transport.

In accordance with the techniques of this disclosure, interleaved reliability control protocols can be used with an appropriate rate control protocol to ensure reliable transfer of data while maintaining high throughput, even when there is high loss and/or when there is a large RTT. For example, the rate control protocol can be as simple as sending at a fixed rate, and the interleaved reliability control protocol will guarantee that data is transferred at a rate equal to the fixed rate times the fraction of packets that arrive successfully, while minimizing buffering and latency during the transfer.

As an example of the quantitative improvements offered by the interleaved reliability control protocols introduced here, suppose that the rate control protocol is to send packets at a fixed rate of R packets per second, the round-trip time between a sender and receiver is RTT seconds, and thus N=R*RTT is the number of unacknowledged packets in flight. For the No-code reliability control protocol, the total buffer size B at the sender is at least $N*\ln(N)$ and the goodput is approximately 1.0, and there is no possible other trade-off points between the needed amount of buffering and goodput. Here, $\ln(x)$ is defined as the natural logarithm of x. With the TF reliability control protocol, the total buffer size at the sender is at least B and the goodput is approximately B/(B+N), where B is the chosen block size in units of packets and can be chosen to trade-off required buffering against goodput. In contrast, for interleaved reliability control protocols such as those described in Luby II, the total buffer size at the sender is at most B and the goodput is approximately N/(N+X), where X is a positive integer parameter chosen to trade-off the required buffering against goodput, and $B=N*(1+\ln((N/X)+1))$ is the buffer size in units of packets.

As an example, if the rate R is 1,000 packets/second and RTT is one second, then N=1,000 packets. For the No-code reliability control protocol, the buffer size at the sender is at least 7,000 packets. For the TF reliability control protocol, if B is chosen to be 4,000 packets, then the goodput is approximately 0.80. For the interleaved reliability control protocols described in Luby II, where X is chosen to be 50, B=4,000 packets (the same value as for the TF reliability control protocol) and the goodput exceeds 0.95, i.e., at most 5% of the received packets are wasted. Thus, in this example the interleaved reliability control protocols require far less buffering than the No-code reliability control protocol with almost the same optimal goodput, and far exceed the goodput of the TF reliability control protocol for the same amount of buffering, i.e., at most 5% wasted transmission for the interleaved reliability control protocols versus 25% for the TF reliability control protocol.

Virtually any rate control protocol can be used with an interleaved reliability control protocol to provide a reliable transport protocol, e.g., send at fixed rate, use a window-based congestion control similar to TCP, use an equation based congestion control protocol such as TCP Friendly Rate Control (TFRC), or use virtually any other rate control protocol, including the rate control protocols introduced herein.

Subsequent description below describes rate control protocols that might be suitable for sending data over multiple independent paths from sender to receiver, as well as describing enhanced interleaved reliability control protocols that can be combined with these rate control protocols. Also described are generation rate protocols that can be used to determine how fast data should be generated for transmission. Finally, the description describes examples of ways to combine these protocols to provide an overall transport protocol that is suitable for streaming data from a sender to a receiver over multiple independent paths that maximizes reliability and goodput and minimizes end-to-end latency.

In this description, a reliable transport protocol is a protocol that reliably transfers data from a sender end system to a receiver end system over a packet based network in such a way that all the data is transferred even when there is the possibility that some of the sent packets are not received.

FIG. 1 is a conceptual diagram illustrating an example of a network 130, a set of sender end systems 100(1)-100(J), and a set of receiver end systems 160(1)-160(K) on which a reliable transport protocol may operate. Sender end systems 100 may also be described as server devices, and receiver end systems 160 may be described as client devices. Typically, such a protocol also includes some mechanisms for adjusting the packet sending rate, where this sending rate may depend on a variety of factors including the application into which the protocol is built, user input parameters, and network conditions between the sender and receiver end systems.

A reliable transport protocol, such as TCP, typically involves several steps. These steps include ways for end systems to advertise availability of data, to initiate transfer of data to other end systems, to communicate which data is to be transferred, and to perform the reliable transfer of the data. There are a variety of standard ways for end systems to advertise availability, to initiate transfer and to communicate what is to be transferred, e.g., session announcement protocols, session initiation protocols, etc. As these steps are well-known, they need not be described here in great detail.

Reliable transfer of packet data comprises deciding at each point in the transfer what data to send in the packets and at what rate to send the packets. The decisions made at each point in time can depend on feedback sent from the receiver end system and on other factors. Typically, the data is presented at a sender end system as a stream of data, and the reliable transport protocol is meant to reliably deliver this stream to the receiver end system in the same order in which it was sent. Often it is the case that the total length of the stream is not known before the transfer is initiated.

This disclosure describes examples of modular architecture for reliable transport protocols. Adler describes how any reliable transport protocol can be thought of as the combination of a reliability control protocol and a rate control protocol. The reliability control protocol is the portion of the overall transport protocol that decides what data to place in each packet during the transfer. The rate control protocol decides when to send each data packet. In many transport protocols, the reliability control and rate control protocols are inseparably intertwined in operation, i.e., this is the case for TCP. However, it is still the case that even such an intertwined protocol can conceptually be partitioned into a reliability control protocol and a rate control protocol.

Adler advocates the design of reliable transport protocols by designing the reliability control protocol and the rate control protocol independently. The advantage of such an approach is that the same reliability control protocol can be used with a variety of rate control protocols, and thus the same reliability control protocol can be used with the rate control protocol that is appropriate for the application and the network conditions in which the overall reliable transport protocol is used. This modular approach to the design can be quite advantageous, because the same reliability control protocol can be used with a diverse set of rate control protocols in different applications and network environments, thus avoiding a complete redesign of the entire reliable transport protocol for each application and network environment. For example, TCP is used for a variety of applications in different network environments, and it performs poorly for some of these applications and network environments due to the poor throughput it achieves as determined by its rate control protocol. Unfortunately, because the reliability control protocol and the rate control protocol are so intertwined in the TCP architecture, it is not possible to simply use a different rate control protocol within TCP to improve its throughput performance in those situations where it works poorly.

In the example of FIG. 1, one of sender end systems 100 may use the techniques of this disclosure to transport data via network 130 to one of receiver end systems 160. For instance, sender end system 100(1) may send media data to receiver end system 160(1) using one or more of the techniques of this disclosure. In one example, sender end system 100(1) may send forward-error corrected media data to receiver end system 160(1) over a plurality of parallel paths through network 130. Such forward-error corrected data may include a plurality of blocks, each of which may be FEC-encoded using a plurality of encoding units. Thus, for each block, sender end system 100(1) may send a plurality of encoding units to receiver end system 160(1).

Receiver end system 160(1) may send data representative of losses over each of the parallel network paths. One example of such data is described in greater detail below with respect to FIGS. 9 and 13. In general, the data may indicate, for each block, a number of encoding units received and a highest sequence number received. Additionally or alternatively, the data may indicate, for each packet flow through the various parallel network paths, a highest sequence number received. Similarly, sender end system 100(1) may receive the data sent by receiver end system 160(1) regarding the losses. Sender end system 100(1) may use this data regarding the losses to modify how subsequent encoding units are formed, e.g., including additional FEC data if the losses are higher than expected, or reducing the amount of FEC data if the losses are lower than expected. This modification of FEC data included in the encoding units may be based on an aggregation of the losses over the parallel network paths.

Additionally or alternatively, sender end system 100(1) may send encoding units of a block before the block has been fully formed. For instance, assuming that a current block is K encoding units in size, sender end system 100(1) may send one or more encoding units for the current block before all K encoding units for the current block have been made available to the sender 100(1). Also, receiver end system 160(1) may receive one or more encoding units of a subsequent block before receiving K encoding units for the current block.

Figure 2:
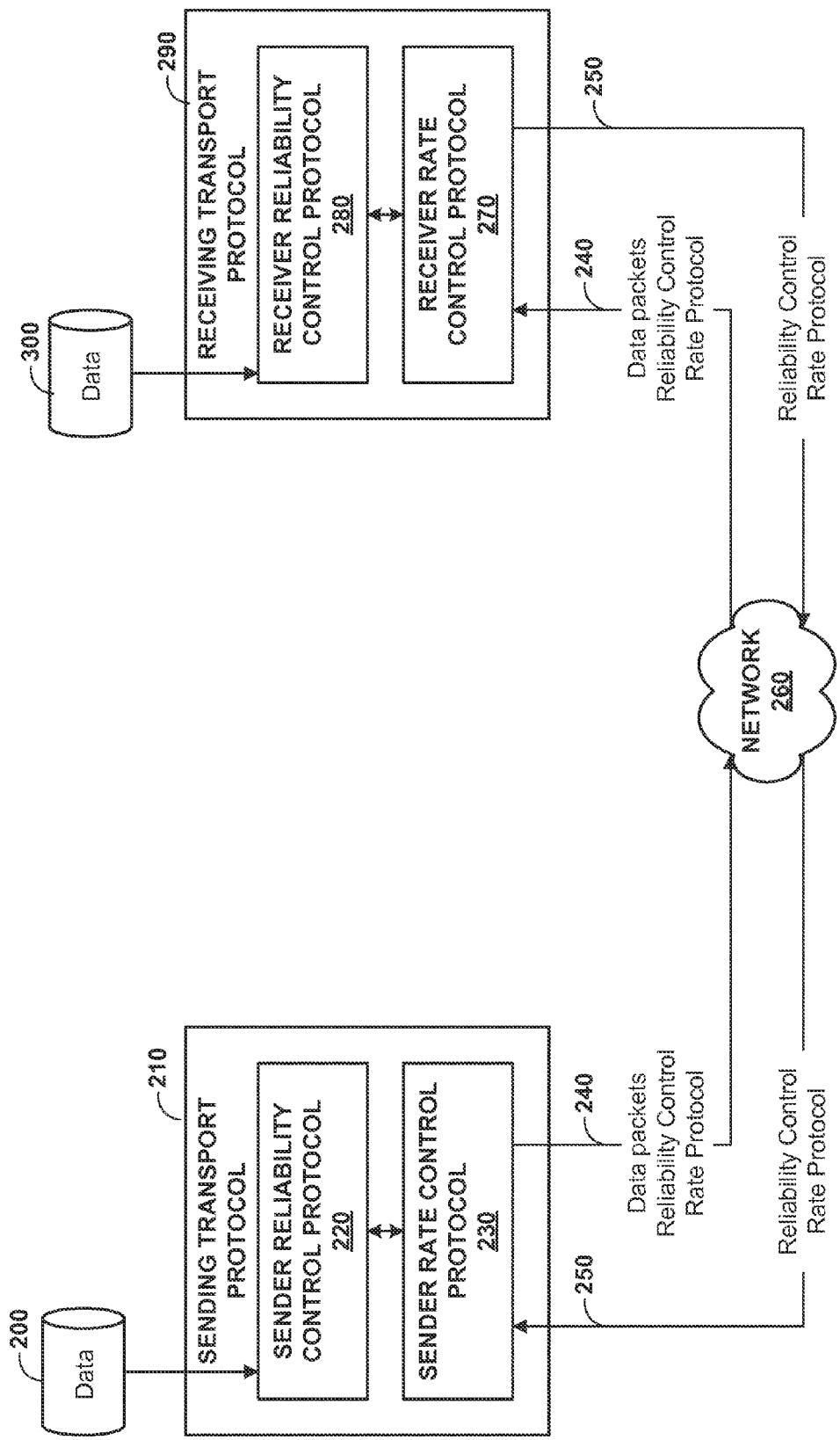
FIG. 2 is an illustration of a modular reliable transport protocol architecture and related system for operating using such protocol.

FIG. 2 is a block diagram illustrating an example modular reliable transport protocol architecture advocated in Adler. The sender transport protocol 210 is partitioned into the sender reliability control protocol 220 and the sender rate control protocol 230. The sender reliability control protocol 220 determines what is sent in each data packet, and the sender rate control protocol 230 determines when each data packet is sent. The sender reliability control protocol 220 may place additional reliability control information into each data packet that can be used by the receiver reliability control protocol 280 within the receiver transport protocol 290.

The sender reliability control protocol 220 may also receive reliability control information 250 from the corresponding receiver reliability control protocol 280 within the receiver transport protocol 290 that is uses to help determine what is sent in each data packet. Similarly, the sender rate control protocol 230 may place additional rate control information into each data packet that can be used by the receiver rate control protocol 270 within the receiver transport protocol 290. The sender rate control protocol 230 may also receive rate control information 250 from the corresponding receiver rate protocol 270 within the receiver transport protocol 290 that is uses to help determine when each data packet is sent.

The reliability control information that is communicated between the sender reliability protocol 220 and the receiver reliability protocol 280 can depend on a variety of factors such as packet loss, and can contain a variety of information as explained later in some detail. Similarly, the rate control information that is communicated between the sender rate control protocol 230 and the receiver rate control protocol 270 can depend on a variety of factors such as packet loss and the measured round-trip time (RTT). Furthermore, the reliability control information and the rate control information may overlap, in the sense that information sent in data packets 240 or in the feedback packets 250 may be used for both reliability control and rate control. Generally, the reliability control and rate control information sent from the sender transport protocol 210 to the receiver transport protocol 290 can be sent with data in data packets 240 or sent in separate control packets 240, or both. These protocols should be designed to minimize the amount of control information that needs to be sent from sender to receiver and from receiver to sender.

For many applications, the data is to be transferred as a stream, i.e., as the data arrives at the sender end system, it is to be reliably transferred as quickly as possible to the receiver end system in the same order as it arrives at the sender end system. For some applications, the latency introduced by the overall transport protocol should be minimized, e.g., for a streaming application, or for an interactive application where small bursts of data are to be transmitted back and forth as quickly as possible between two end systems. Thus, the overall latency introduced by the transport protocol should be minimized.

The sender reliability control protocol 220 and the receiver reliability control protocol 280 typically both require buffers to temporarily store data. Generally, the data that is buffered at the sender reliability control protocol 220 includes at least the earliest data in the stream for which the sender reliability control protocol 220 has not yet received an acknowledgement of recovery from the receiver reliability control protocol 280 up to the latest data in the stream that the sender reliability control protocol 220 has started to send in data packets. The size of the buffer at the receiver reliability control protocol 280 is generally at least the amount of data in the stream from the earliest data not yet recovered up to the latest data for which data packets have been received.

The buffering requirements of the sender reliability control protocol 220 has a direct impact on how much temporary storage space is required by the sender reliability control protocol 220, and how much latency the sender reliability control protocol 220 introduces into the overall reliable data transfer. The buffering requirements of the receiver reliability control protocol 280 have a similar impact. Thus, it is important to minimize the buffering requirements of both the sender reliability control protocol 220 and the receiver reliability control protocol 280.

The reliability control protocol determines what is sent in each data packet. In order to utilize the connection between the end systems efficiently, it is important that the sender reliability control protocol 220 send as little redundant data in packets as possible, in order to ensure that whatever data packets are received at the receiver reliability control protocol 280 are useful in recovering portions of the original data stream. The goodput of the reliability control protocol is defined to be the length of the original stream of data divided by the total length of data packets received by the receiver reliability control protocol 280 during the recovery of the original stream of data. A goodput goal is for the reliability control protocol to result in a goodput of 1.0 or nearly so, in which case the minimum amount of data is received in order to recover the original stream of data. In some reliability control protocols, the goodput may be less than 1.0, in which case some of the transmitted data packets are wasted. Thus, it is important to design reliability control protocols so that the goodput is as close to 1.0 as possible in order to efficiently use the bandwidth consumed by the data packets that travel from the sender end system to the receiver end system.

One solution that has been used in reliability control protocols is that of Forward Error-Correction (FEC) codes, such as Reed-Solomon codes or Tornado codes, or chain reaction codes (which are information additive codes) such as those described in Luby I or Shokrollahi I. Original data is partitioned into blocks larger than the payload of a packet and then encoding units are generated from these blocks and send the encoding units in packets. Erasure correcting codes, such as Reed-Solomon or Tornado codes, generate a fixed number of encoding units for a fixed length block. For example, for a block comprising input units, N encoding units might be generated. These N encoding units may comprise the B original input units and N-B redundant units.

Figure 3:
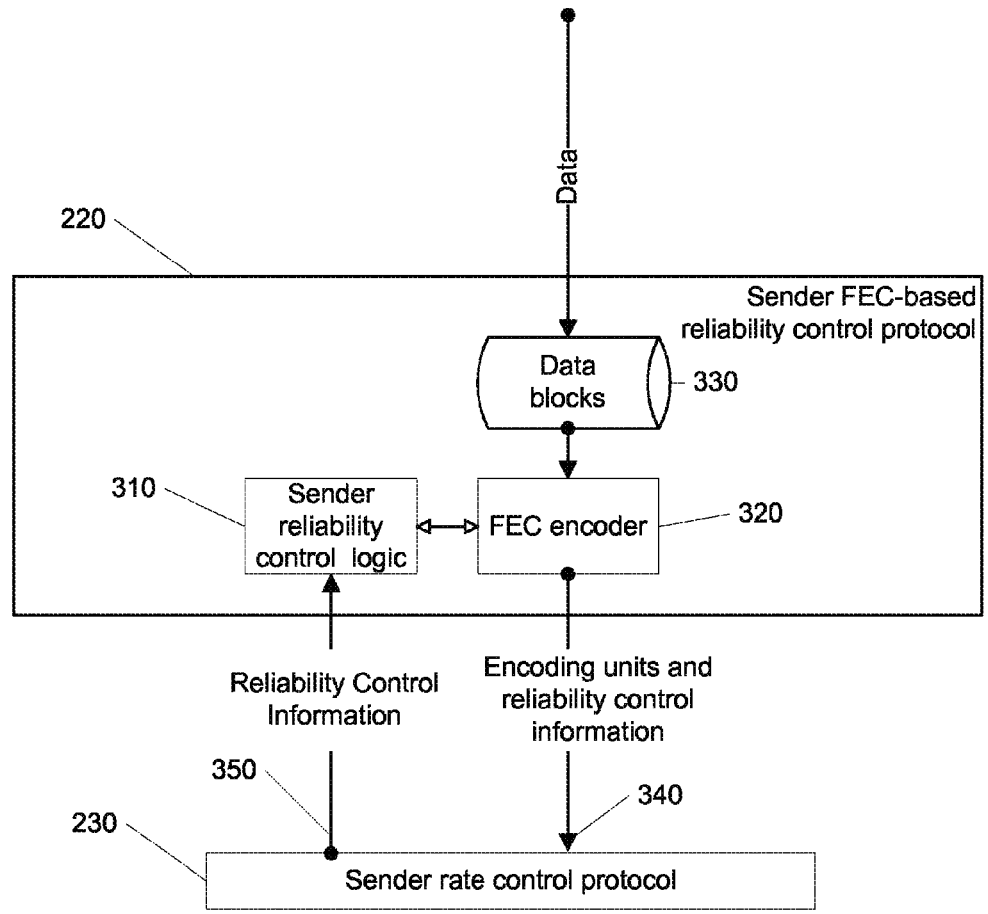
FIG. 3 is an example of a sender FEC-based reliability control protocol architecture and related system for operating using such protocol.
Figure 4:
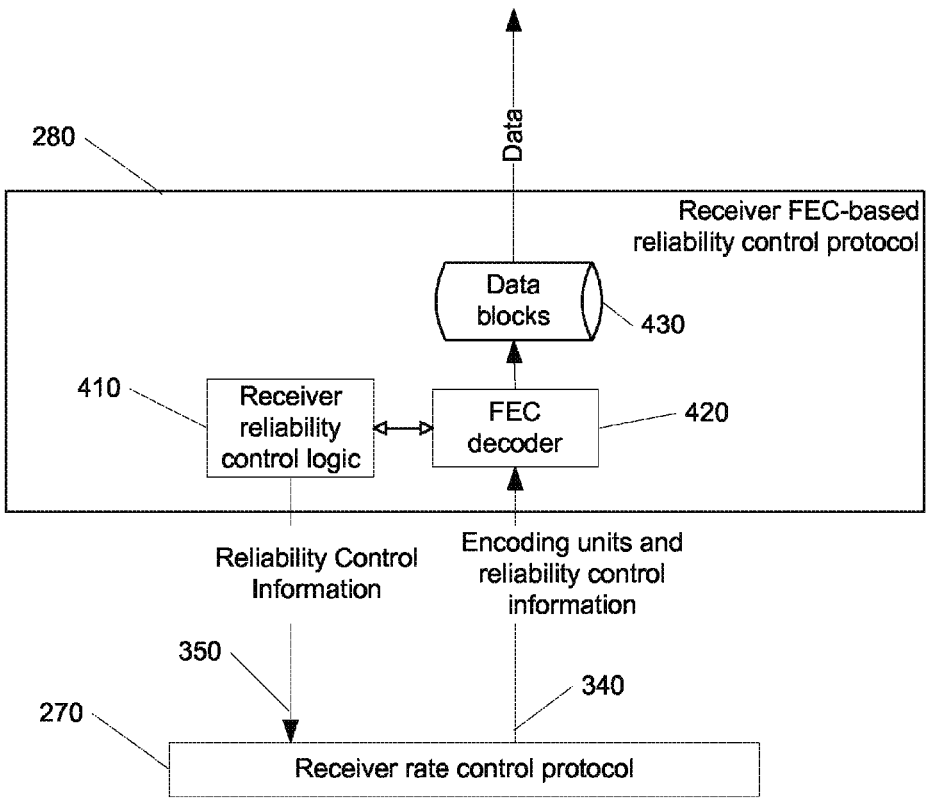
FIG. 4 is an example of a receiver FEC-based reliability control protocol architecture and related system for operating using such protocol.

A FEC-based reliability control protocol is a reliability control protocol that uses FEC codes. FIG. 3 is a block diagram illustrating an example of a sender FEC-based reliability control protocol 220, and FIG. 4 is a block diagram illustrating an example of a receiver FEC-based reliability control protocol 280. The sender reliability control logic 310 partitions the original stream of data into data blocks 330, and then instructs the FEC encoder 320 to generate encoding units for each block. The sender reliability control logic 310 determines how encoding units and reliability control information 340 are passed on to a device handling the sender rate control protocol 230, and it also handles the reliability control information 350 that is sent by the receiver FEC-based reliability control logic 410 shown in FIG. 4.

The sender reliability control logic 310 should ensure that enough encoding units are received by the receiver FEC-based reliability control protocol 280 shown in FIG. 4 to ensure that each block is recovered. All blocks may be of essentially the same length, or the block length may vary dynamically during the transfer as a function of a variety of parameters, including the rate at which the stream of data is made available to the sender, the sending rate of the data packets, network conditions, application requirements and user requirements.

Suppose a given block of data is B encoding units in length. For some FEC codes the number of encoding units required to recover the original block of data is exactly B, whereas for other FEC codes the number of encoding units required to recover the original block of data is slightly larger than B. To simplify the description of the FEC-based reliability control protocols, it is assumed that B encoding units are sufficient for the recovery of the data block, where it is to be understood that a FEC code that requires more than B encoding units in order to decode a block can be used with a slightly decreased goodput and a slightly increased buffering requirement.

The receiver reliability control logic 410 in FIG. 4 is responsible for ensuring that B encoding units are received in order to decode the data block, and then the FEC decoder 420 is used to recover the data block 430. The receiver reliability control logic 410 is responsible for receiving the encoding units and reliability control information 340 sent from the sender FEC-based reliability control protocol 220, and for generating and sending reliability control information 350 that is eventually sent to and processed by the sender reliability control logic 310.

The TF reliability control protocol partitions the stream of data into generally equal size blocks. The overall architecture is that there is one active data block at any point in time, and the sender generates and sends encoding units for that data block until it receives a message from the receiver indicating that enough encoding units have arrived to reconstruct the block, at which point the sender moves on to the next block. Thus, all encoding units for a given block are generated and sent and the block is recovered before any encoding units for the subsequent block are generated and sent.

Figure 5:
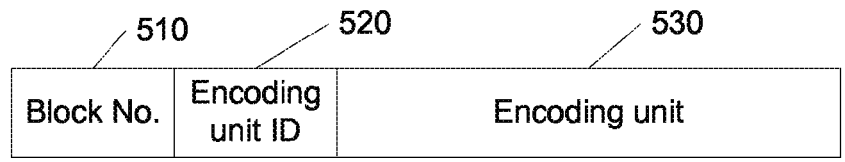
FIG. 5 shows one possible set of formats that could be used by a system implementing a TF reliability control protocol.
Figure 5:
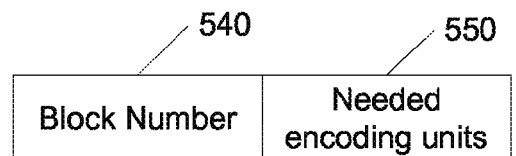

FIG. 5 is a block diagram illustrating one possible set of formats that could be used by a TF reliability control protocol. The sender data format in this example describes the format in which the sender TF reliability control protocol sends encoding units and the corresponding reliability control information to the receiver TF reliability control protocol. This includes the Block number 510 which indicates which block the encoding unit is generated from, the encoding unit ID 520 which indicates how the encoding unit is generated from the block, and the encoding unit 530 which can be used by the FEC decoder within the receiver TF reliability control protocol to recover the block. The receiver feedback format describes the format in which the receiver TF reliability control protocol sends reliability control information to the sender TF reliability control protocol. This includes the Block number 540, which is the block number of the current block the receiver TF reliability control protocol is receiving encoding units for to recover the block, and Needed encoding units 550 which is the number of additional encoding units the receiver TF reliability control protocol needs to recover the block.

Figure 6:
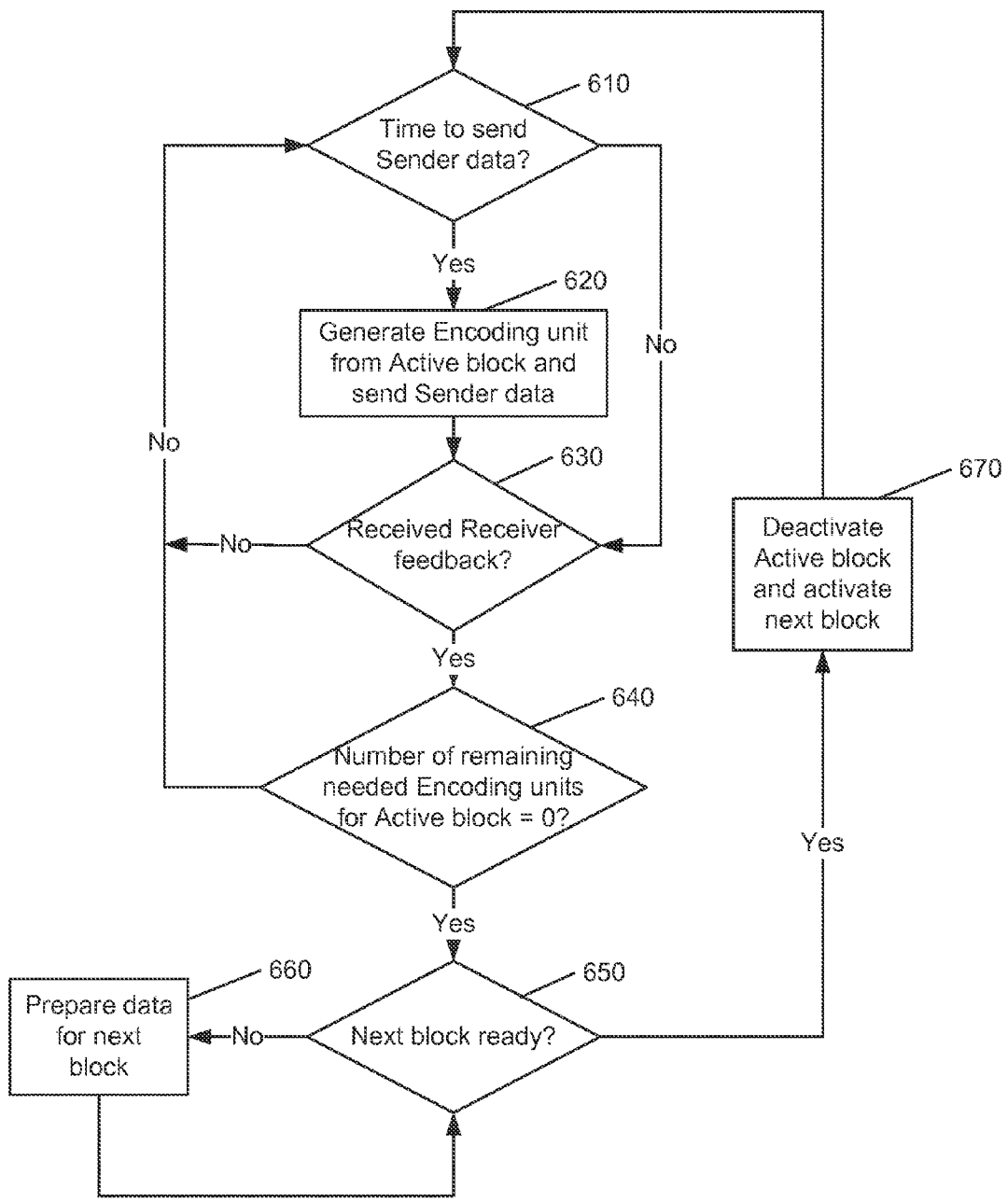
FIG. 6 is a flowchart illustrating logic of a system implementing a sender TF reliability control protocol.

FIG. 6 is a flowchart illustrating an example of a process for implementing a sender TF reliability control protocol. In accordance with this example process, a sender device (such as one of sender end systems 100 of FIG. 1) continually checks to see if it is time to send sender data (step 610), which is determined by the corresponding sender rate control protocol. If it is time to send sender data, then an encoding unit is generated from the active block and the sender data is sent (620). An example of a form for the sender data is the format shown in FIG. 5. The process also continually checks to see if receiver feedback has been received 630. An example of a form for the receiver feedback data is the format shown in FIG. 5. If there is receiver feedback, then it is processed to update the information on how many additional encoding units the receiver needs to recover the active block. It then checks to see if the number of encoding units needed is zero 640, and if it is, then it sees if the next block in the stream of data is available 650. If it is not available, it prepares the next block 660 until it is ready, and then goes on to deactivate the current active block and activate the next block 670. In general, the next block may be being prepared while the current active block is being transmitted.

It should be understood that each of the protocols described herein could be implemented by a device or software or firmware executed by a suitable processor. For example, implementations could be made using network devices such as routers and host computers, as well as being implemented on wireless transmitters, retransmitters, and other wireless devices. The protocols described herein can be implemented in software, has methods, and/or has apparatus configured to implement such protocols.

Figure 7:
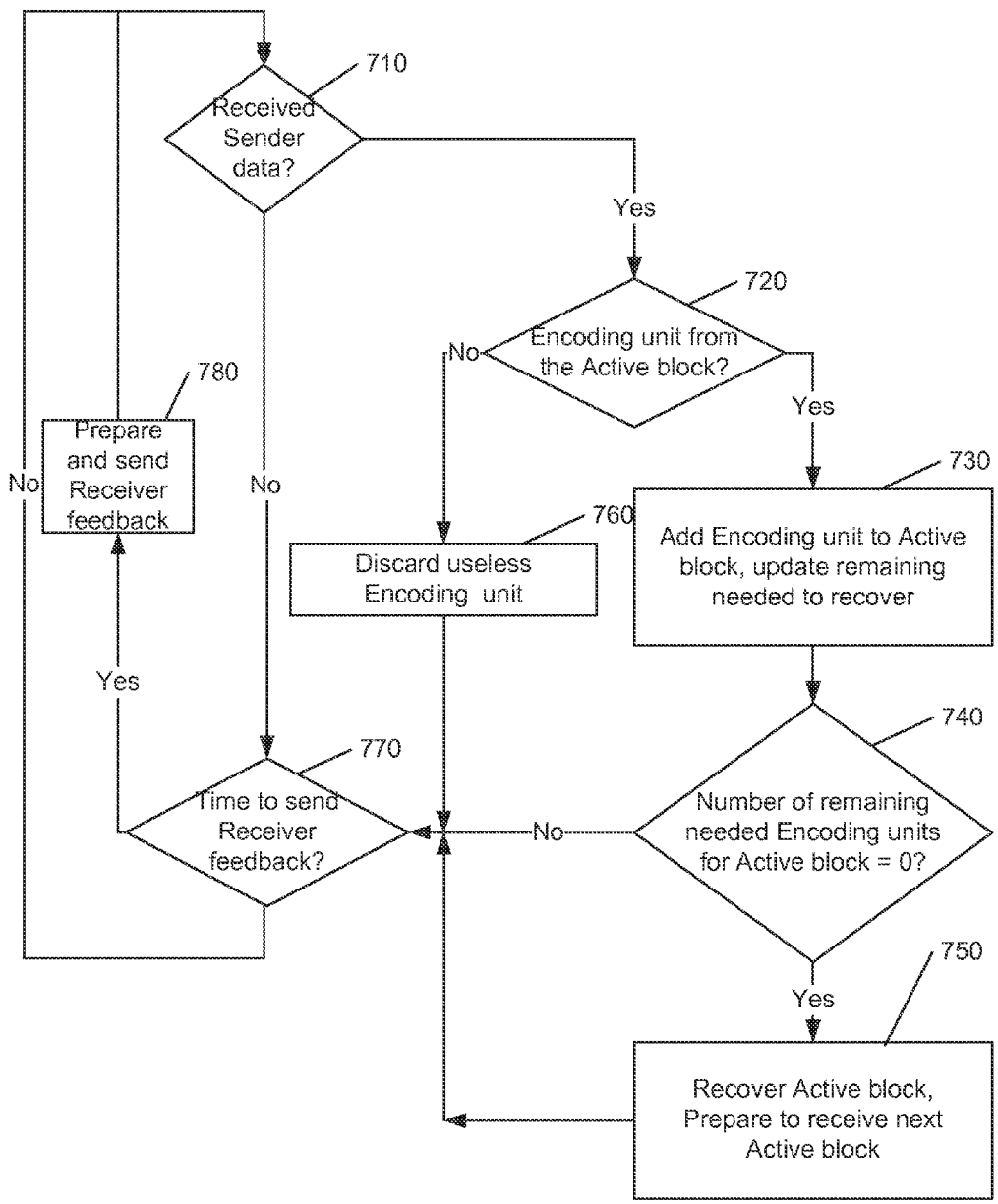
FIG. 7 is a flowchart illustrating logic of a system implementing a receiver TF reliability control protocol.

FIG. 7 is a flowchart illustrating an example process for implementing a receiver TF reliability control protocol. In accordance with the receiver TF reliability control protocol, a receiver device, such as one of receiver end systems 160 (FIG. 1), may continually check to see if sender data has been received 710, which is in the sender data format shown in FIG. 5. If so, then it is checked if the encoding unit within the sender data is from the active block 720. If the encoding unit is not from the active block then it is discarded 760, and thus this is wasted sender data since it is not useful in recovering any block.

If the encoding unit is from the active block then it is added to the set of encoding units already received for the active block and the needed number of encoding units for the block is decremented by one 730. It then checks to see if the needed number of encoding units is zero 740, and if it is then it recovers the active block using the FEC decoder and prepares for reception of encoding units for the next active block 750. The receiver TF reliability control protocol also continually checks to see if it is time to send receiver feedback 770, which is determined by the corresponding receiver rate control protocol. If it is time then receiver feedback is prepared and sent 780, which is in the format of the receiver feedback format shown in FIG. 5.

Note that this is a partial description of the overall TF reliability control protocol. For example, it does not specify the conditions under which receiver feedback is sent by the receiver TF reliability control protocol. This can be triggered by reception of received sender data, by a timer that goes off every so often, or by any combination of these events or any other events as determined by the receiver rate control protocol. Generally, receiver feedback is sent often enough to keep the sender TF reliability control protocol informed on a regular basis about the progress of reception of encoding units at the receiver TF reliability control protocol, and yet not so often as to consume nearly as much bandwidth as the sender data containing the encoding units sent from the sender TF reliability control protocol to the receiver TF reliability control protocol.

Note that the TF reliability control protocol can be considered "wasteful" in the following sense. Let B be the size of each data block in units of encoding units, let R be the rate at which packets are sent by the rate control protocol, and let RTT be the round-trip time between the sender and receiver end systems and let $N=R*RTT$. Suppose there is no packet loss between the sender and receiver. Then, after the sender TF reliability control protocol has sent B encoding units for an active block (which is enough to recover the block), it continues to send N additional encoding units until it receives receiver feedback from the receiver TF reliability control protocol indicating that enough encoding units have arrived to recover the block, and all of these N encoding units are wasted. To recover a block of length B requires sending B+N encoding units, and thus the goodput is $B/(B+N)$.

If B is relatively small in comparison to N, then the goodput is far from optimal, and a lot of the used bandwidth between the sender and receiver is wasted. On the other hand, if B is large in comparison to N, then the size of the buffers in the sender and receiver TF reliability control protocols can be large, and this also implies that the latency in the delivery of the data stream at the receiver is large. As an example, suppose the size of an encoding unit is 1 kilobyte, the rate R is 1,000 encoding units per second=1 megabyte per second=8 megabits per second, and RTT is one second. Then $N=R*RTT=1$ megabyte. If the size of a block is set to B=3 megabytes, then the goodput is only approximately $(B/(B+N))=0.75$, i.e., around 25% of the sent encoding units are wasted. To increase the goodput to, for example, 0.98 so that only around 2% of the sent encoding units are wasted requires a very large buffer size of B=49 megabytes. This size buffer then leads to a latency added by the reliability control protocol of at least 50 seconds.

There are many possible variants on the TF reliability control protocol described above. For example, the sender TF reliability control protocol could stop sending encoding units after B encoding units have been sent from a block and wait to receive receiver feedback to indicate whether or not enough encoding units have been received to recover the block. If there is no loss then this variant will not send any encoding units that will be wasted, but even in this case there is a gap of RTT time between each block, and if the bandwidth is not being used for any other purpose, this protocol still leads to a wasted amount of bandwidth of $R*RTT$. Furthermore, the total delivery time will be slower by a factor of $B/(B+N)$ than is ideal. If there is loss, then this variant will add even further latencies and slow-downs in delivery, because eventually additional encoding units will have to be sent to recover the block in place of the lost encoding units.

The TF reliability control protocol has an advantage over the No-Code reliability control protocol because any lost encoding unit can be compensated for by any subsequently received encoding unit generated from the same block without need for receiver feedback. The primary reason that the TF reliability control protocol is wasteful is because of the sequential nature of the protocol, in the sense that the transfer of each block is completed before the transfer for the next block begins. The improved reliability control protocols described herein can be used to interleave the processing of the blocks in an intelligent fashion.

Figure 8:
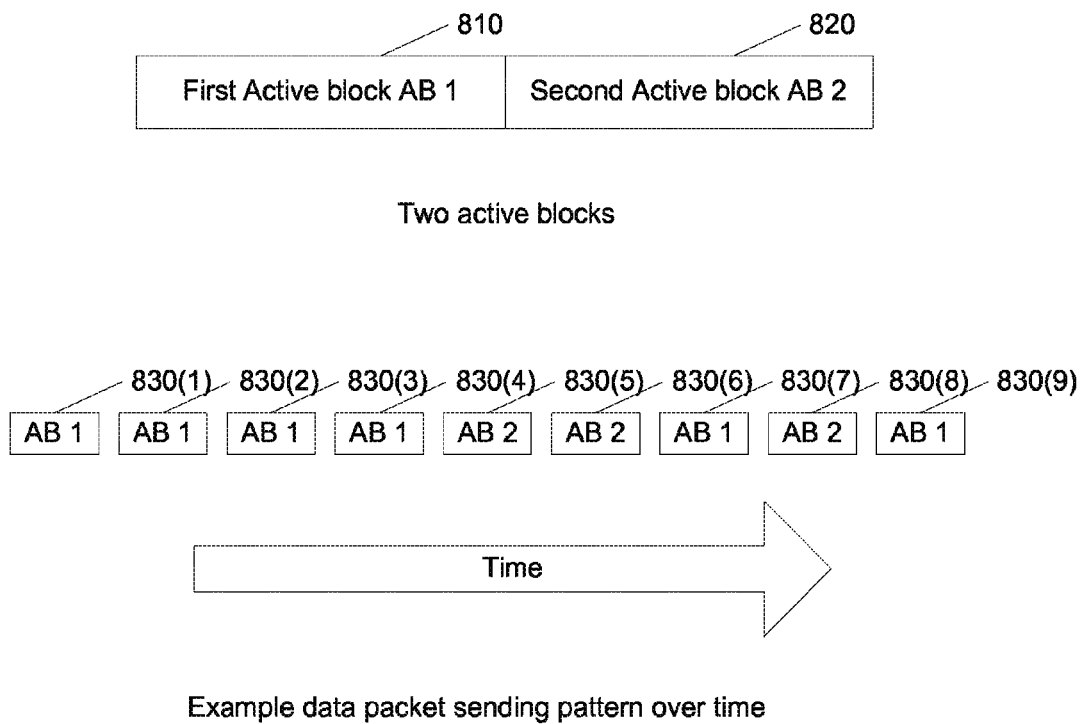
FIG. 8 is an illustration of active blocks.

An illustrative example of interleaving is shown in FIG. 8. In this example, there are two active blocks, the first active block AB 1 (810) and the second active block AB 2 (820). The lower part of FIG. 8 shows an example of a pattern of data packet sending over time, where each packet is labeled as either AB 1 or AB 2, depending on whether the corresponding packet contains an encoding unit for AB 1 or AB 2. In this example, four packets containing encoding units for AB 1 (830(1), 830(2), 830(3) and 830(4)) are sent first, then two packets containing encoding units for AB 2 (830(5) and 830(6)), followed by one packet contain an encoding unit for AB 1 (830(7)), one packet containing an encoding unit for AB 2 (830(8)) and one packet containing an encoding unit for AB 1 (830(9)). In general, the interleaving between encoding units for different blocks should be designed to maximize goodput and to minimize the total buffering requirements (and the consequent introduced latency).

A sender device, such as one of sender end systems 100 (FIG. 1) may send interleaved data to a receiver device, such as one of receiver end systems 160 (FIG. 1), as shown in FIG. 8. In this manner, FIG. 8 depicts an example of a method including sending a first set of encoding units for a first block, wherein the first set of encoding units includes fewer than a minimum number of encoding units needed to recover the first block, after sending the first set of encoding units, sending a second set of encoding units for a second block, wherein the second block is subsequent to the first block in the stream of data, and after sending the second set of encoding units, sending a third set of encoding units including one or more encoding units for the first block. Likewise, FIG. 8 also depicts an example of a method including receiving a first set of encoding units for a first block, wherein the first set of encoding units includes fewer than a minimum number of encoding units needed to recover the first block, after receiving the first set of encoding units, receiving a second set of encoding units for a second block, and after receiving the second set of encoding units, receiving a third set of encoding units including one or more encoding units for the first block.

FIG. 8 portrays an example in which encoding units are sent for a block before the block is fully formed. For instance, encoding units for active block AB 1 may be sent before AB 1 is fully formed, i.e., not all of AB 1 is yet available at the sender when the first encoding units 830(1), 830(2) for AB 1 are sent by the sender, and nevertheless, encoding units of AB 1 may be sent before AB 1 has been fully formed. Additionally or alternatively, AB 2 may be considered not fully formed, and nevertheless, encoding units of AB 2 may be sent before AB 2 has been fully formed. For instance, encoding units 830(4), 380(5) for AB 2 may be sent before all of AB 2 is fully available at the sender. Likewise, FIG. 8 portrays an example of transmission of encoding units for AB 1 and AB 2 in an interleaved fashion.

Figure 9:
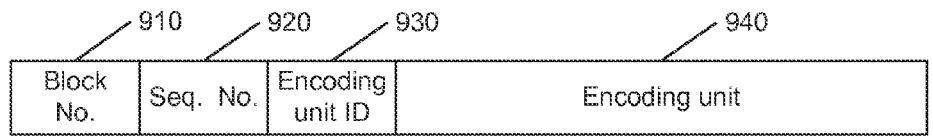
FIG. 9 is illustration of a possible set of formats that could be used by an interleaved reliability control protocol.
Figure 9:
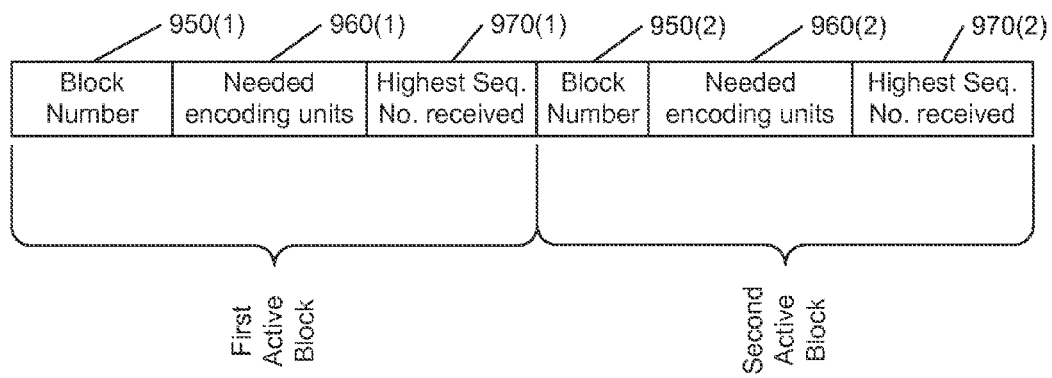

FIG. 9 is a block diagram illustrating an example set of formats that may be used by an interleaved reliability control protocol. The sender data format describes a format in which the sender interleaved reliability control protocol could send encoding units and the corresponding reliability control information to a receiver interleaved reliability control protocol. This example includes a Block number 910 which indicates which block the encoding unit is generated from, a Sequence number 920 which indicates how many encoding units have been sent from this block, an encoding unit ID 930 which indicates how the encoding unit is generated from the block, and an encoding unit 940 which can be used by the FEC decoder within the receiver interleaved reliability control protocol to recover the block. The receiver feedback format describes a format in which the receiver interleaved reliability control protocol could send reliability control information to the sender interleaved reliability control protocol. For each of the active blocks, this includes a Block number (950(1), 950(2)), how many additional encoding units are needed to recover the block (960(1), 960(2)) and the highest sequence number received so far from that block (970(1), 970(2)).

In this manner, FIG. 9 represents an example in which a receiving device, such as one of receiver end systems 160, sends, and a sending device, such as one of sender end systems 100, receives data representing losses of data over each of a plurality of parallel network paths, the data representing the losses including data identifying each of a plurality of blocks for which encoding units were received, numbers of encoding units needed for each of the blocks, and data defining highest sequence numbers received for network packets related to each of the blocks.

Figure 10:
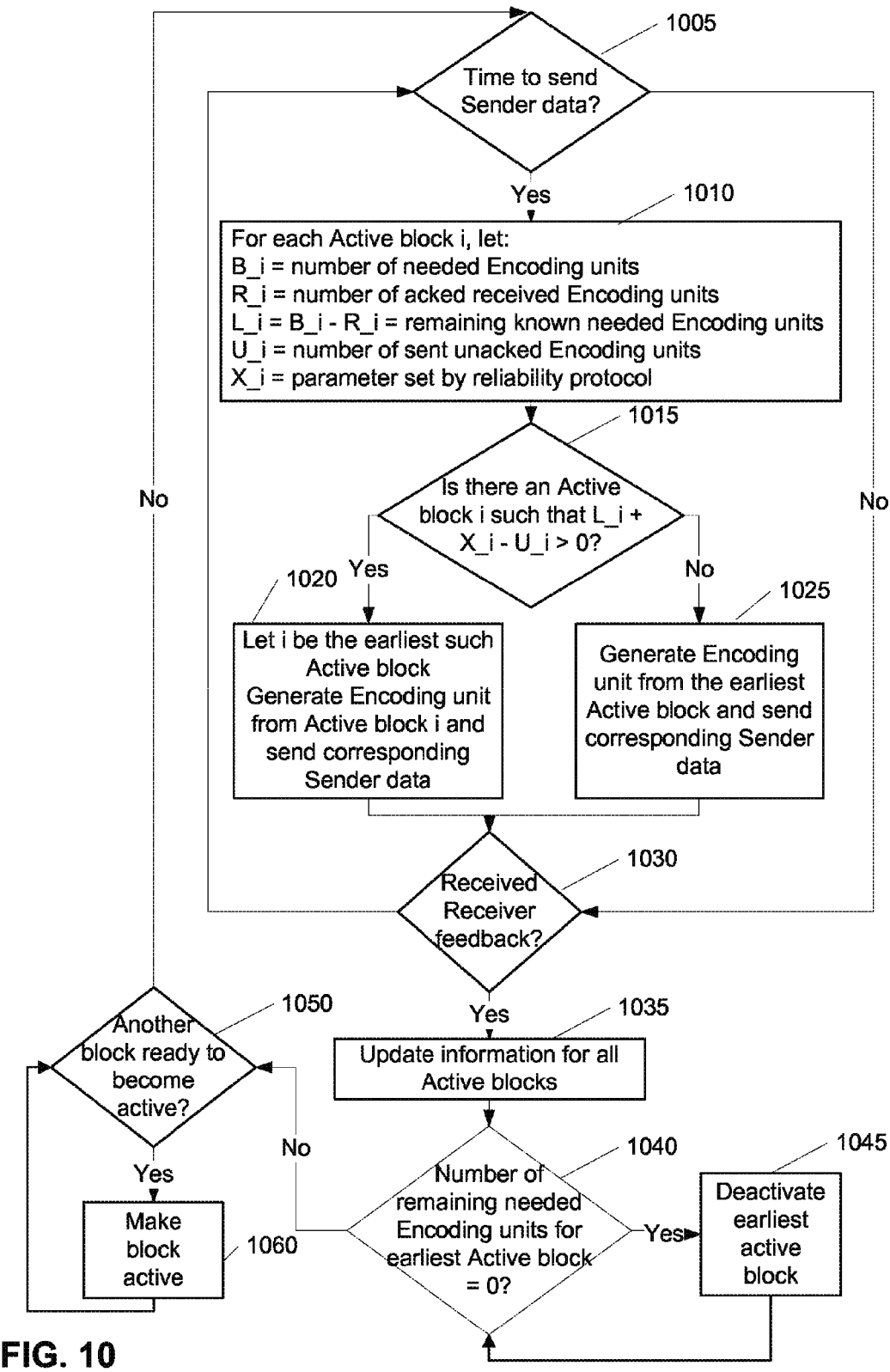
FIG. 10 is an illustrative example of the logic of a system implementing a basic sender interleaved reliability control protocol.

FIG. 10 is a flowchart illustrating an example of logic of a Basic sender interleaved reliability control protocol. The example protocol of FIG. 10 may be performed by a sending device, such as one of sender end systems 100 of FIG. 1. In this example of the protocol, the Basic sender interleaved reliability control protocol continually checks to see if it is time to send sender data 1005, which is determined by the corresponding sender rate control protocol. If it is time to send sender data then the Basic sender interleaved reliability control protocol uses the following set of rules to determine from which active block to generate and send an encoding unit.

The Basic sender interleaved reliability control protocol keeps track of the following variables for each active block i (1010): $B\_i$ is the number of encoding units needed to recover that block; $R\_i$ be the number of encoding units that the Basic sender interleaved reliability control protocol knows that the Basic receiver interleaved reliability control protocol has received from that block based on received receiver feedback; $L\_i=B\_i-R\_i$ is the remaining number of unconfirmed encoding units that the Basic sender interleaved reliability control protocol knows that the Basic receiver interleaved reliability control protocol needs to receive to recover the block; $U\_i$ is the number of encoding units sent for the block but for which an acknowledgement has not yet been received by the Basic sender interleaved reliability control protocol; $X\_i$ is a parameter that determines how aggressively the Basic sender interleaved reliability control protocol will send encoding units for the block.

These variables can be determined as follows: The value of $B\_i$ is determined by the size of the block and the size of each encoding unit. Note that processing can start on blocks that are not yet completely available to the sender, i.e., blocks that are not yet fully formed can become active and encoding units can be sent for them. In this case, $B\_i$ might be determined to be the number of encoding units needed to recover block i if the block were of the size that is currently available to the sender, in which case $B\_i$ can dynamically grow during the sending process as more of block i is made available to the sender until block i is completely formed at which point the value of $B\_i$ remains unchanged. Thus, $B\_i$ might start at 1 when the initial part of block i is first available, and grow as more of block i becomes available to the sender until $B\_i$ reaches its final value, i.e., $B\_i$ reaches the size of the complete block i.

Generally, each encoding unit is of the same size for a given block, and sometimes for all blocks, and the size is chosen to be suitable for the payload of a data packet, e.g., the length of an encoding unit could be 1024 bytes. The size of each block may be generally the same or it may vary, or it may depend on the arrival rate of the data stream at the sender, or it may depend on the sending rate of data packets, or it may depend on a combination of these and other factors. The value of $R\_i$ is determined based on receiver feedback received in step 1030. The value of $U\_i$ is the difference between the Sequence number in the last sender data sent containing an encoding unit for the block and the Highest Sequence number received in a receiver feedback for the block.

In this manner, a number of encoding units needed to recover a block (e.g., $B\_i$) may be calculated based on a size of the block and sizes of encoding units for the block. Likewise, a number of additional encoding units needed to recover the block (e.g., $L\_i$) may be calculated as the difference between the number of encoding units needed to recover the block (e.g., $B\_i$) and the number of received encoding units (e.g., $R\_i$).

The value of $X\_i$ is a function of the overall reliability control protocol, and as is explained later there are tradeoffs in the choice of $X\_i$. The value of $X\_i$ could remain constant during the sending of all encoding units for the block, or it could change value in a variety of different ways, some of which are explained later. Essentially, $X\_i$ at each point in time is a measure of how many additional encoding units the Basic sender interleaved reliability control protocol is willing to send beyond the minimal needed to recover the block without any additional receiver feedback from the Basic receiver interleaved reliability protocol. Since $L\_i$ is the number of encoding units needed to recover block i beyond the already acknowledged received encoding units, and since $U\_i$ is the number of encoding units for block i that are in flight and not yet acknowledged, then $L\_i+X\_i-U\_i$ is the number of additional encoding units for block i that the Basic sender interleaved reliability control protocol is willing to send at this point in time.

The tradeoff on the value of $X\_i$ is the following. As $X\_i$ increases the goodput decreases, since possibly up to $X\_i$ encoding units beyond the minimal needed to recover active block i could be received by the Basic receiver interleaved reliability control protocol. On the other hand the total size of active blocks decreases as $X\_i$ increases, because the number of packet time slots allocated to complete the reliable reception of active block i increases as $X\_i$ increases. Because $X\_i$ encoding units for block i can be lost and still the Basic receiver is able to recover the block without waiting for receiver feedback to trigger transmission of additional encoding units, this allows faster recovery of block i once it becomes active. It turns out that the tradeoffs between total buffer size and goodput as a function of $X\_i$ are much more favorable than the corresponding tradeoffs for other reliability control protocols such as the TF reliability control protocol or the No-code reliability control protocol.

In step 1015, a test is made to determine if there is an active block i that satisfies the inequality $L\_i+X\_i-U\_i>0$. The value of $L\_i$ is a number of encoding units the receiver would need to recover the block based on encoding units already acknowledged by receiver feedback. $U\_i$ is the number of unacknowledged encoding units in flight for this block and thus $L\_i-U\_i$ is the number of additional encoding units that will have to be sent if none of the encoding units in flight are lost, and thus if $L\_i-U\_i$ is zero or smaller, then the receiver will be able to recover the block if all the encoding units in flight for the block arrive. On the other hand, some of the encoding units might be lost, and $X\_i$ is the number of additional encoding units that the sender is willing to send proactively to protect against losses to avoid having to transmit additional encoding units for the block triggered by subsequent receiver feedback.

Thus, if $L\_i+X\_i-U\_i>0$ then the sender is willing to send more encoding units for block i, and if it is zero or negative then the sender is not willing to send more encoding units for block i. Thus, if in step 1015 there is an active block i that satisfies $L\_i+X\_i-U\_i>0$, an encoding unit is generated and corresponding sender data is sent for the earliest such active block in step 1020. If there is no such active block then an encoding unit is generated and corresponding sender data is sent from the earliest active block among all active blocks in step 1025. Preferably, the parameters are set in such a way as to avoid as much as possible having no block satisfy the condition in step 1015 which forces the execution of step 1025, because essentially step 1025 should be done as a last resort to clear out the buffers within the Basic sender interleaved reliability control protocol. The sent data in steps 1020 and 1025 may be sent via multiple paths to the same receiver.

If there are active blocks that are not yet completely formed then step 1015 should be modified to also consider these not yet completely formed blocks. In one variant, the corresponding condition shown in step 1015 for active but not yet completely formed blocks should be instead whether or not all of the source encoding units for the not yet completely formed active block have been sent or not, and if they have not all been sent then the remaining unsent source encoding units can be sent. Thus, in this variant, the number of encoding units that can be sent for block i is up to $B\_i$, where $B\_i$ is the current number of source encoding units in the partially formed block i. In a second variant, the corresponding condition shown in step 1015 for active but not yet completely formed blocks should be instead to set $X\_i=0$, and to retransmit encoding units that have been acknowledged as not received based on an enhanced receiver feedback that also indicates which encoding units were lost among the encoding units that have been acknowledged as either lost or received Thus, in this variant the condition $L\_i+X\_i-U\_i>0$ in step 1015 is replaced with the condition $L\_i-U\_i>0$ if block i is active but not yet fully formed. In this case, if all source encoding units have been sent already but some have been acknowledged as being lost, then these encoding units can be resent if the condition $L\_i-U\_i>0$ is satisfied.

One variant of the protocol is the following. The number of Active blocks starts at one, i.e., the first block of the data stream is activated. Only when there is no active block that satisfies the condition in step 1015 is a new block in the stream of data is activated. Using this simple strategy, blocks only become active blocks when needed, and thus the number of active blocks, and consequently the buffer size, self-adjusts to the number needed to guarantee a goodput $B\_i/(B\_i+X\_i)$ for block i.

Another variant of the protocol is the following. In this variant the total buffer size always remains the same size (if all blocks are the same size this means there is always fixed number of active blocks), whereas the goodput may vary. Whenever there is no active block that satisfies the condition in step 1015 then the values of the $X\_i$ for the active blocks is increased until there is an active block that satisfies the condition in step 1015. Whenever it is appropriate the values of $X\_i$ for active block i is reduced, with the constraint that there is always an active block that satisfies the condition in step 1015. There are many possible ways to increase and decrease the values of the $X\_i$, e.g., increase all values equally, increase all values proportionally equally, increase the values for the first active blocks more than the values for the last active blocks, increase the values for the last active blocks more than the values for the first active blocks. Similar strategies can be used to decrease the values of the $X\_i$. One skilled in the art can think of many other variations as well.

There are many other combinations and extensions of these variants of the protocol that are too numerous to describe, but should be obvious to one skilled in the art.

In step 1030 it is checked to see if any receiver feedback has been received, and if so all of the parameters are updated based on this in step 1035, i.e., the parameters $R\_i$, $U\_i$ and $X\_i$ for all active blocks i. In step 1040 it is checked to see if the earliest active block has been acknowledged as fully recovered, and if so then the earliest active block is deactivated in step 1045 and processing returns to step 1040, and if not then processing continues on to step 1050. In step 1050 it is checked to see if another block is ready to become active, and if so then in step 1060 this next block is made active and processing returns to step 1050, and if not then processing continues to step 1005. In general, the next block or several next blocks may be in preparation while the current active block is being transmitted, and ready to be activated at or before the time the earliest active block is to be deactivated.

In this manner, FIG. 10 portrays an example of a method including sending, to a client device, forward-error corrected data via a plurality of parallel network paths, receiving, from the client device, data representing losses of the data sent over each of the network paths, and modifying, based on the data representing the losses, an amount of forward-error correction data sent for subsequent data transmissions over the parallel network paths. The received data representing the losses may include, for each of the parallel network paths, data identifying a highest sequence number received for a packet flow sent via the respective parallel network path (e.g., as discussed below with respect to FIG. 13), and/or data identifying each of a plurality of blocks for which encoding units were received by the client device, numbers of encoding units needed for each of the blocks, and data defining highest sequence numbers received by the client device for network packets related to each of the blocks (e.g., as discussed above with respect to FIG. 9).

Figure 11:
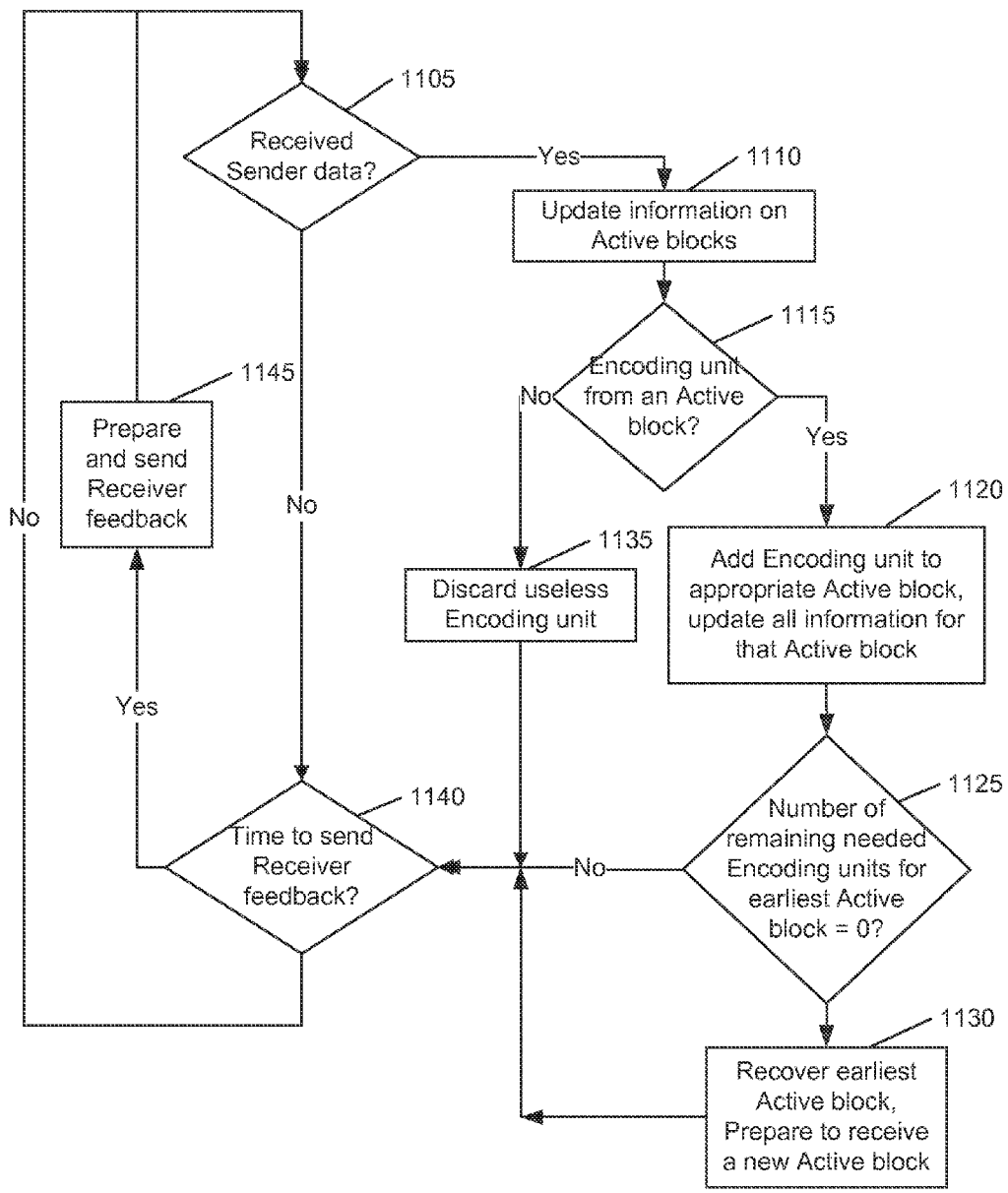
FIG. 11 is an illustrative example of the logic of a system implementing a basic receiver interleaved reliability control protocol.

FIG. 11 is a flowchart illustrating an example of the logic of the Basic receiver interleaved reliability control protocol. In this version of the protocol, the Basic receiver interleaved reliability control protocol continually checks to see if sender data has been received 1105, which for example could be in the sender data format shown in FIG. 9. If so, it updates its information on all active blocks in step 1110 and checks to see if the received encoding unit within the sender data is from an active block 1115. If the encoding unit is from a block that is already recovered or from a block that is too far forward in the data stream to be a current active block then it is discarded in step 1135, and thus this is wasted sender data since it is not useful in recovering any block. Otherwise the encoding unit is added to the pool of encoding units for the active block from which it was generated and how many encoding units are needed to recover the active block is updated in step 1120.

The number of needed encoding units for block i is calculated as $B\_i$ minus the number of received encoding units. There are a variety of ways of communicating the value of $B\_i$ to the Basic receiver interleaved reliability control protocol, e.g., the value of $B\_i$ could be included within each sender data, the value of $B\_i$ could be sent in separate control messages, the value of $B\_i$ could be the same for all blocks and communicated during session initiation, etc.

It is then checked to see if the needed number of encoding units for the earliest active block is zero in step 1125, and if it is then it recovers the active block using the FEC decoder and prepares for reception of encoding units for a new next active block in step 1130. The Basic receiver interleaved reliability control protocol also continually checks to see if it is time to send receiver feedback 1140, which is determined by the corresponding receiver rate control protocol. If it is time then receiver feedback is prepared and sent in step 1145, which for example could be in the receiver data format shown in FIG. 9.

Note that the above is a partial description of an overall Basic interleaved reliability control protocol. For example, it does not specify the conditions under which receiver feedback is sent by the Basic receiver interleaved reliability control protocol. This can be triggered by reception of received sender data, by a timer that goes off every so often, or by any combination of these events or any other events as determined by the receiver rate control protocol. Generally, receiver feedback is sent often enough to keep the Basic sender interleaved reliability control protocol informed on a regular basis about the progress of reception of encoding units at the Basic receiver interleaved reliability control protocol, and yet not so often as to consume nearly as much bandwidth as the sender data containing the encoding units sent from the Basic sender interleaved reliability control protocol to the Basic receiver interleaved reliability control protocol.

The Basic interleaved reliability control protocol can have a much better tradeoff between goodput and the size of the buffers than the TF reliability control protocol or the No-code reliability control protocol. For example, suppose that there are at most two active blocks for the Basic interleaved reliability control protocol. Let B be the size of each data block in units of encoding units, let R be the rate at which packets are sent by the rate control protocol, and let RTT be the round-trip time between the sender and receiver end systems and let $N=R*RTT$, and suppose X is a fixed constant for all active blocks. In this example, assume that all of these parameters have fixed values, although in general they may vary dynamically during the data transfer, and assume that $B>=N$.

Suppose there is no packet loss between the sender and receiver. Then, the Basic sender interleaved reliability control protocol sends B+X encoding units for the earliest active block and then sends encoding units from the next active block until it receives receiver feedback that indicates the earliest active block has been recovered successfully by the Basic receiver interleaved reliability control protocol. At this point the Basic sender interleaved reliability control protocol deactivates the earliest active block, the next active block for which some encoding units have already been sent becomes the earliest active block, and the next block is activated to become an active block. Thus, B+X encoding units are used to recover a block of length B, and thus X of the sent encoding units are wasted.

On the other hand, if $B>=N$ then there will always be an active block that satisfied the inequality shown in step 1015 of FIG. 9. Thus, the goodput is $B/(B+X)$, whereas the total size of the buffer is $2*B$ if there are two active blocks. As an example, suppose the size of an encoding unit is 1 kilobyte, the rate R is 1,000 encoding units per second=1 megabyte per second=8 megabits per second, and RTT is one second. Then $N=R*RTT=1$ megabyte. If the size of a block is 1 megabyte, which means that B=1,000 encoding units and X is set to 10 encoding units then the goodput is approximately $(B/(B+X))=0.99$, i.e., at most 1% of the sent encoding units are wasted, whereas the total buffer size is only 2 MB, which means that the Basic sender interleaved reliability control protocol adds around 2 seconds of latency in this example. Note that this buffer size is smaller by a factor of 25 than that of the sender TF reliability control protocol in the same situation.

In the example described above where there is no packet loss, the value of X could be set to zero, increasing the goodput up to 1.0. However, when there is any packet loss it turns out that setting $X>0$ can have significant advantages. For example, if at most 10 encoding units are lost out of each 1,000 sent in the above example, then an analysis shows that the same goodput and buffer sizes is achieved with $X=10$, whereas this would not be necessarily true with $X=0$. When packet loss is more variable and unknown, and in particular when the number of packets lost per B packets can be more than X, it still turns out that goodput and buffer sizes that can be achieved by the Basic interleaved reliability control protocol are quite good and quantifiably better than what can be achieved using the TF reliability control protocol or the No-code reliability protocol.

As another example, suppose the sending rate R in packets per second and the round-trip time RTT remains constant, and $N=R*RTT$. Suppose packet loss is random such that each packet is lost with probability p. Further suppose that each block i is of size $B\_i$ is the same size C in units of packets, and that each $X\_i$ is the same value Y. Further suppose that the variant of the protocol described above is used that only activates a new block when needed. Consider a block from the time it is first activated till the time it is deactivated because an acknowledgement that it has been recovered is received from the receiver. At some time t when C−N packets of the block have been acknowledged there are $F=N+Y$ packets in flight that are unacknowledged and the sender knows that the receiver needs $N=F-Y$ of these packets to recover the block. At time t+RTT, of the F packets that were in flight for the block at time t, $(1-p)*F$ of the packets have been received by the receiver and the sender has received an acknowledgement.

Thus, at time t+RTT the sender knows that the number of remaining packets that the receiver needs is now N−(1-p)

*F=p*F−Y and thus the number of packets in flight is now p*F. Continuing the logic, at time t+i*RTT the sender knows that the number of remaining packet that the receiver needs is p^i*F−Y and thus the number of packets in flight is p^i*F. When the number of packets that the sender knows the receiver needs goes below zero then the block is completed, and this is true at time t+i*RTT when i satisfies p^i*F−Y<=0. The smallest value of i when this inequality is true is when i is approximately ln((N/Y)+1)/ln(1/p).

Since in each RTT approximately (1−p)*N packets are received by the receiver, this means that the farthest the sender protocol could have proceeded in the data stream beyond the block in consideration by the time the block is acknowledged as received is at most (ln((N/Y)+1)/ln(1/p))*(1/p)*N packets. Noting that (1−p)/ln(1/p)<=1 for all values of p, this means that the size of the buffer is at most C+ln((N/Y)+1)*N packets in length. Of course, this is all assuming that the random process behaves exactly as its expected behavior, but this does give a rough idea of how the protocol behaves, at least as Y is not too small. In this case, the goodput is C/(C+Y). Thus, for example, if RTT=1, R=1,000, C=1,000, Y=50, then N=1,000, ln(1,000/50) is approximately 3, and the buffer size is around 1,000+(3+1)*1,000=5,000 and the goodput is 1,000/(1,000+50) which is around 0.95.

There are many variants on the Basic interleaved reliability control protocol described above that should be apparent after reading this description. For example, as described above, the sender reliability control protocol could use more than two active blocks at a time, and this has the potential advantage of being able to reduce the overall size of the buffers used at the sender and receiver reliability control protocols at the expense of more complexity in managing more active blocks.

As another example of a variant, it can be beneficial to use a random process to determine from which active block an encoding unit is to be sent. This is because packet loss patterns can be systemic and are not necessarily random, and thus for any deterministic procedure used to select which encoding unit to send next there is packet loss pattern such that some blocks are never recovered but still packets are delivered to the receiver. For example, consider the loss pattern where whenever the deterministic procedure sends an encoding unit from a particular active block then that encoding unit is lost, but whenever it sends an encoding unit for any other active block then that encoding unit arrives at the receiver.

Then, in this example, the receiver never recovers the active block even though the receiver still receives encoding units. To overcome this type of systematic loss, it is advantageous for the sender reliability control protocol to randomize from which active block to send the next encoding unit. One simple way to achieve this is for the sender reliability control protocol to buffer together batches of Q encoding units to be sent, and then send each batch of Q encoding units in a random order. More sophisticated methods may also be used, e.g., for each encoding unit to be sent, assign a dynamically changing probability that it is sent the next time an encoding unit is to be sent, where the probability increases the more times it is not selected. Another variant is to modify step 1020 as shown in FIG. 10 of the Basic sender interleaved reliability control protocol so that the encoding unit sent is randomly generated (using an appropriately chosen probability distribution that may favor earlier active blocks and that may vary dynamically over time) from among the active blocks that satisfy the condition in step 1015.

If the parameter $X\_i$ is used to determine when to send an encoding unit for active block i, there are many variants on how to adjust $X\_i$ during the transmission. One example is to fix $X\_i$ to a value and maintain that value throughout the transmission. For example, $X\_i$ could be set to zero, or to some other fixed value like 10. Another example is to fix $X\_i$ to a value at the beginning of the transmission of encoding units from active block i, and then $X\_i$ is incremented every time an encoding unit is to be sent and the condition for sending an encoding unit from active block i is not met. There are many variants on how $X\_i$ can be incremented. As an example, $X\_i$ could be incremented by zero the first N such times, and incremented by N/B each subsequent time. It is also possible that at some steps the increment of $X\_i$ could be negative.

As other variants, instead of only using the parameter $X\_i$ for each active block i as described in the Basic interleaved reliability control protocol, one could use other ways of determining whether or not an encoding unit should be sent from a particular active block. For example, an average of the packet loss probability could be maintained, and then the number of encoding units allowed to be sent from an active block could be determined based on the assumption that the recent packet loss probability is a good predictor for the current packet loss probability. For example, if the average loss probability is currently p, then one strategy is to modify step 1015 as shown in FIG. 10 of the Basic sender interleaved reliability control protocol so that the condition is $L\_i+X\_i/(1-p)-U\_i*(1-p)>0$.

The rationale behind this particular choice is that if $U\_i$ encoding units are in flight for active block i, only a fraction 1−p of them will arrive at the Basic receiver interleaved reliability control protocol, and if $X\_i/(1-p)$ additional packets are sent then $X\_i$ will arrive at the Basic receiver interleaved reliability control protocol. Thus, overall on average the Basic receiver interleaved reliability control protocol will receive $B\_i+X\_i$ encoding units for active block i, and the value of $X\_i$ additional encoding units can be set to be enough to take into account variability in the packet loss rate to avoid depending on receiver feedback for the transmission of a sufficient number of encoding units to recover the block.

Other variants of the interleaved reliability control protocol take into account the possibility that packets may not arrive in the same order at the receiver as the sending order. Thus, subsequent receiver feedback from the receiver may for example report back a larger number of received encoding units for a given active block than previous receiver feedback, even though the highest sequence number received from the block is the same. Thus, the logic in the Basic interleaved reliability control protocol can be modified in both the sender and receiver to accommodate accounting for reordered packets.

As described earlier, step 1025 of the Basic sender interleaved reliability control protocol as shown in FIG. 10 is generally to be avoided by setting the parameters appropriately so that at least one active block satisfies condition 1015 at each point in time. A variant on step 1025 is to vary which active block is chosen from which to generate and send an encoding unit. For example, an active block can be chosen randomly in step 1025, or the choice could cycle through the set of active blocks.

Steps 1040 through 1060 of FIG. 10 describe methods for inactivating recovered blocks and activating additional blocks to send. One simple method is to always activate a next block when the earliest block is inactivated due to recovery, thus always maintaining the same number of active blocks. A variant that can save on the total buffer size and the consequent latency is to only activate a next block when it is time to send an encoding unit from a block that is beyond the latest current active block.

For some variants of the Basic interleaved reliability control protocol, the number of active blocks at any point in time is fixed. A variant is to allow the number of active blocks to vary depending on a variety of factors, including at what rate data is made available for transmission, how much packet loss is occurring, variability in the sending rate of packets, etc. For example, under low packet loss conditions and low sending rate conditions the number of active blocks may be kept small, but as the loss conditions become worse or the sending rate increases the number of active blocks may be allowed to temporarily grow. Thus, buffering and latency vary dynamically depending on the conditions in which the protocol is operating.

The aggregate size of active blocks may also be allowed to vary even if the number of active blocks remains fixed. In this case, the size of each subsequent active block may be different than the previous block. For example, as the data availability rate grows the size of subsequent active blocks may also grow, and as the sending rate grows the size of subsequent active blocks may grow. The length of each active block may be a function of time, e.g., at most so much time may pass before a new block is formed, it may be a function of length, i.e., each block may be at most so long, or it may be a combination of these and other factors.

The end of one block and the start of the next block may be decided automatically by the interleaved reliability control protocol, it may be determined by an application, or some combination of these and other factors. For example, a block of the data stream may have logical meaning to an application, e.g., a Group of Pictures block or an I-frame for an MPEG stream, and thus the way that the interleaved reliability control protocol partitions the stream of data into blocks may respect the boundaries of the logical application blocks. Alternatively, the application may indicate to the interleaved reliability control protocol preferred boundaries between blocks, and the interleaved reliability control protocol tries to respect these boundaries as well as possible but may still be allowed to make boundaries between blocks at points besides those supplied by the application.

Another variant of the interleaved reliability control protocol is to allow the protocol to not deliver all blocks reliably in sequence to the receiver, but instead to try as well as possible to achieve this goal subject to other constraints. For example, in a streaming application it may be important to deliver the stream of data as reliably as possible, but there are also other constraints such as timing constraints on the data stream. For example, it could be the case that after a certain time a certain portion of the data is no longer relevant, or that there are strong limits on how much latency the interleaved reliability control protocol can introduce, e.g., in an interactive Video conferencing application. In these cases, the sender interleaved reliability control protocol and receiver interleaved reliability control protocol may be modified to allow some of the blocks to be skipped before they are completely recovered.

For example, the sender interleaved reliability protocol may be constrained to only allow an active block to be active for a given amount of time, or it may have hard time constraints for each block supplied by an application after which it is no longer allowed to send encoding units for the block, or it may be allowed to only send a provided maximum number of encoding units for each block, or any combination of these constraints. Similar constraints may be applicable to the receiver interleaved reliability control protocol. For these applications, the interleaved reliability control protocol can be modified to respect these constraints.

In some variants of interleaved reliability control protocols, there is one sender and one receiver. Other variants include but are not limited to: one sender and multiple receivers; one receiver and multiple senders; multiple senders and multiple receivers. For example, in the one sender/multiple receiver variant when the sending channel is a broadcast or multicast channel, the sender reliability control protocol could be modified so that the sender computes for each active block i the value of R_i as the minimum number of received acknowledged encoding units from any receiver in step 1010 of FIG. 10.

As another example for the one sender/multiple receiver variant when the sender sends a separate stream of packets to each receiver, the sender reliability control protocol could be modified so that the sender computes for each active block i and for each receiver j the value of R_ij as the number of received acknowledged encoding units from receiver j for active block i and computes L_ij=B_i−R_ij in step 1010 of FIG. 10, and U_ij could be computed as the number of sent but still unacknowledged encoding units for active block i sent to receiver j, and then the condition in step 1015 could be changed to determine if there is an active block i such that, for some receiver j, L_ij+X_i−U_ij>0.

As another example, for the many sender/one receiver variant, the receiver reliability control protocol could be modified so that the receiver receives encoding units concurrently from multiple senders, for the same or different active blocks, and sends receiver feedback either by a broadcast or multicast channel to all senders, or using a separate packet stream with potentially separate receiver feedback to each sender. As another example, for the multiple sender/multiple receiver variant, the modified steps described above for the one sender/multiple receiver case and the multiple sender/one receiver case can be combined.

Another variant is that a sender may concurrently be sending multiple data streams, each using a separate instance of a sender interleaved reliability control protocol, or a version of a sender interleaved reliability control protocol that takes into account the different data streams, e.g., the aggregate sending rate for all packets for all streams may be limited, and thus the sender may decide to prioritize sending packets for some data streams over others. Similarly, a receiver may concurrently be receiving multiple data streams, each using a separate instance of a receiver interleaved reliability control protocol, or a version of a receiver interleaved reliability control protocol that takes into account the different data streams, e.g., the aggregate receiving rate for all packets for all streams may be limited, and thus the sender may decide to prioritize receiving packets and processing and sending receiver feedback for some data streams over others.

Any of the above variants can be combined with one another. For example, the protocol where some blocks may not be reliably delivered to receivers due to for example to timing and/or bandwidth limitations can be combined with the multiple sender/multiple receiver variant.

In this manner, FIG. 11 portrays an example of a method including receiving, from a server device, forward-error corrected data via a plurality of parallel network paths, determining losses of the data over each of the network paths, and sending data representing the losses of the data over each of the network paths to the server device.

Figure 12:
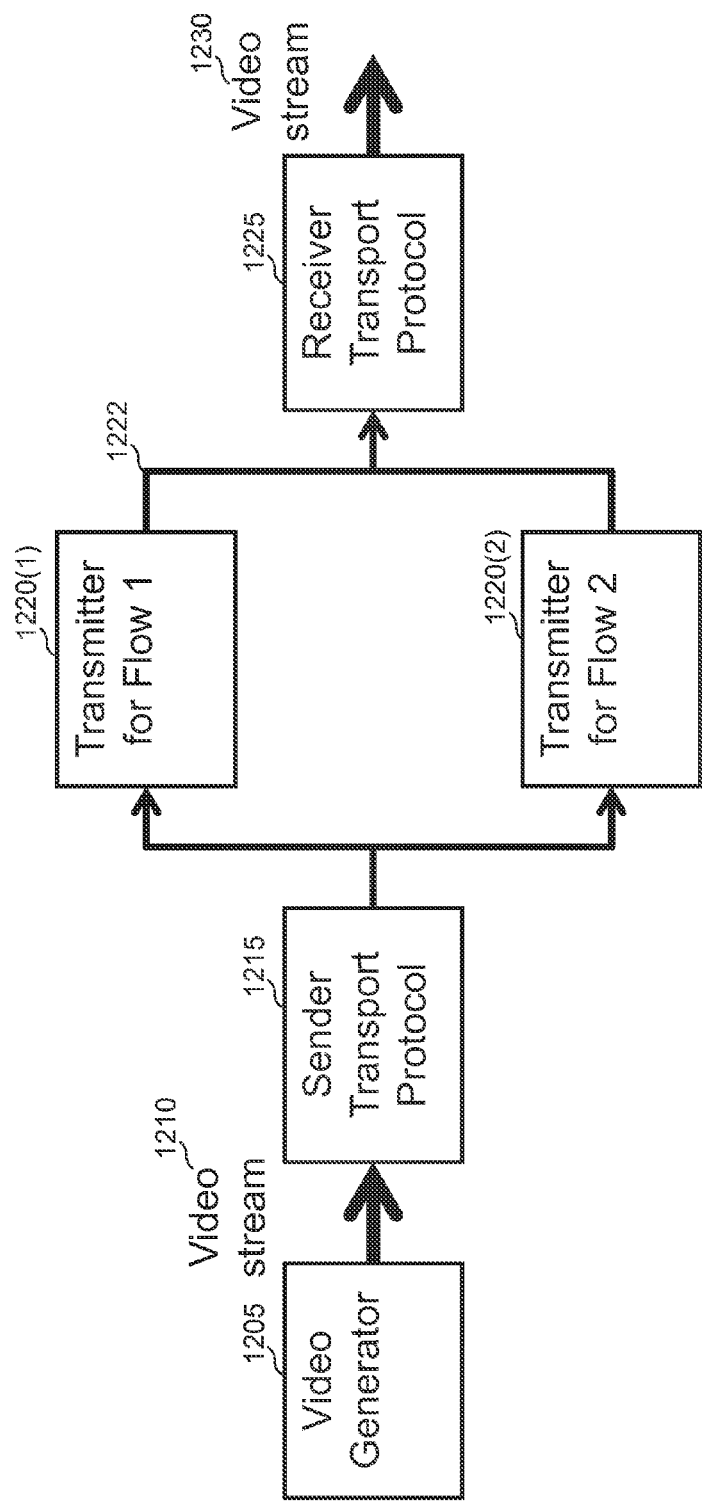
FIG. 12 is a block diagram of a multipath streaming system.

FIG. 12 is block diagram of a multipath streaming system that may utilize multipath FEC-based reliability transport control methods in accordance with the techniques of this disclosure. In this example, a video generator (1205) generates a video stream (1210), which is received by a sender transport protocol (1215). The sender transport protocol (1215) determines what data to send for the video stream (1210), and for each piece of data to be sent determines along which path flow to send it.

For each path flow, a transmitter for that path flow (1220 (1), 1220(2)) sends the data for that path flow over a network (1222) to be received, at least in part, by a receiver transport protocol (1225). The receiver transport protocol (1225) recovers in as full fidelity as possible the original video stream and produces this video stream (1230) to other devices, possibly over other networks and through other sets of servers, to end user devices play back. Note that video is an example data stream and non-video streams (e.g., audio streams or other data streams) can be handled analogously.

By using multiple paths, and by coordinating which paths are used when, etc., as explained herein, improvements such as lowered overall latency or higher overall data throughput can be obtained, which generally imply a higher quality streaming experience. This can be the case even with the multiple paths have disparate properties such as individual latency, bandwidth and loss rate and those properties might, in addition to varying from path to path, also vary from time to time. As such, packets that initially are emitted by the video generator in one order might be received in a different order as some paths might deliver their packets faster than other paths.

In this architecture, the sender transport protocol (1215) and the receiver transport protocol (1225) may have a well-established set of data formats that they use to communicate with one another, and there may be data flowing from the sender transport protocol (1215) to the receiver transport protocol (1225), as well as control and feedback information that flows from the receiver transport protocol (1225) to the sender transport protocol (1215).

The number of path flows and the number of transmitters may be any number, and the numbers may be different, e.g., there may be ten path flows and three transmitters, and four of the path flows may go through a first transmitter (1220(1)), and three path flows may go through each of a second transmitter and a third transmitter. The transmitters (1220) may be collocated within the same hardware device as the sender transport protocol (1215), or the transmitters (1220) may be with hardware devices that are separate from the hardware device that hosts the sender transport protocol (1215), and these devices may communicate with one another based on a standard transport protocol such TCP or UDP, for example using Bluetooth or WiFi. The networks over which the transmitters (1220) send their data to the receiver transport protocol (1225) may be different for different transmitters, e.g., some of the transmitters may send using a 3G network, others may use LTE, others may use WiFi. The transmitters may use different operator networks of the same or different type, e.g., a first transmitter may use the AT&T network whereas a second transmitter may use the Verizon network. There may be intermediate receiving devices previous to the receiver transport protocol 1225, e.g., a first transmitter may send to a first server operated by a first CDN whereas a second transmitter may send to a second server operated by a second CDN, and the first and second servers may what they receive to the receiver transport protocol 1225.

Figure 13:
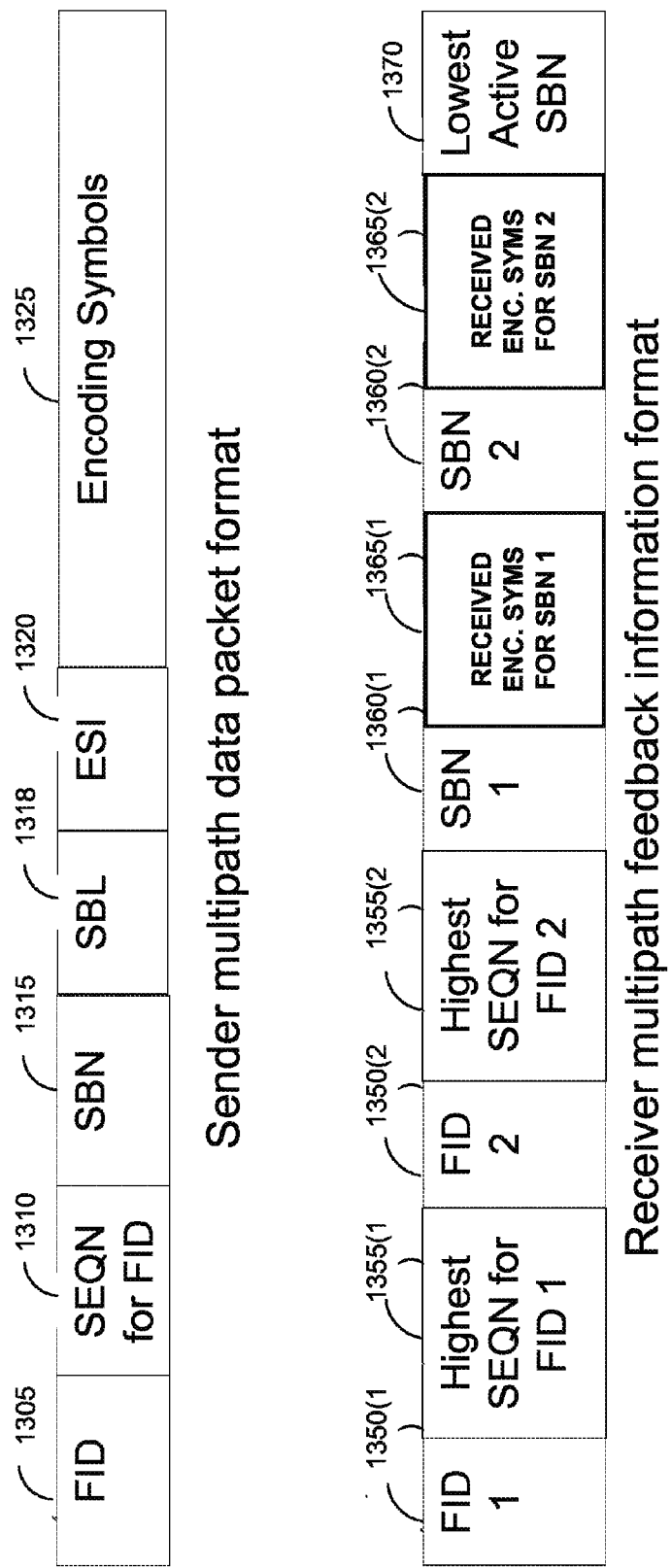
FIG. 13 shows one possible set of data formats that could be used by a multipath streaming system implementing a multipath reliability control protocol.

A Multipath FEC-based Interleaved Reliability Control Protocol Method is now described with reference to FIG. 13. FIG. 13 is a conceptual diagram illustrating an example multipath reliability control protocol data packet format and corresponding feedback information format.

As shown at the top of FIG. 13, each data packet comprises a flow identifier, FID (1305), a sequence number for the FID, SEQN for FID (1310), a source block number, SBN (1315), a source block length in units of source symbols, SBL (1318), an encoding symbol identifier (also called an encoding unit identifier), ESI (1320), and one or more encoding symbols (1325). (Encoding symbols are sometimes also called encoding units). The FID (1305) identifies the path flow to which this packet is to be sent, and the SEQN for FID (1310) is a number that increments by one for each packet sent to this flow, and thus the SEQN for FID (1310) is scoped by the FID (1305).

The SBN (1315) identifies from which source block the encoding symbol(s) (1325) carried in this packet are generated from, wherein the SBN is a number that generally increments by one for each subsequent source block of data to be sent. The SBL (1318) identifies the number of source symbols in the source block. The SBL (1318) may be omitted when the packet carries source symbols, and this is preferable for some applications since it can be the case, for example see the description of an open source block below, that the number of source symbols in the source block is not known, i.e., an open source block, at the time that at least some of the source symbols of the source block are sent.

Alternatively, the SBL (1318) may be carried in all data packets, but its value may be set to zero for packets carrying source symbols that are sent before the size of the source block is determined, or the SBL (1318) may be set to zero for all packets carrying source symbols, or the SBL (1318) may be set to the current number of source symbols in the source block at the time that the packet carrying the source symbols is sent. The SBL (1318) is preferably set to the number of source symbols in the source block for all packets carrying repair symbols. The SBL (1318) may also be partitioned into two sub-fields, a one-bit flag indicating whether or not the source block is open or closed, i.e., the flag is set to zero if the source block size is not determined at the time the packet is sent (open source block) and the flag is set to one if the source block size is determined at the time the packet is sent (closed source block), and the remaining portion of the SBL (1318) provides the number of source symbols in the source block.

The sender feedback logic unit (1420) may set this SBL flag to indicate that the source block is closed in the packet that carries the last source symbol of the source block, in addition to indicating with this SBL flag that the source block is closed in all packets that carry repair symbols for this source block, and in each packet where the flag indicates that the source block is closed, the SBL size is set to the actual number of source symbols in the closed source block. The ESI (1320) identifies which encoding symbol(s) (1325) are carried in this packet for the source block identified by the SBN (1315), and thus the ESI (1320) is scoped by the SBN (1315). Each time a new data packet is to be sent along a particular path flow, the FID of that path flow is placed into the packet, the SEQN for that FID is incremented by one and placed into the packet, the SBN of an active source block for which encoding symbols are to be sent is placed into the packet, the corresponding ESI of the encoding symbols is placed into the packet, and the encoding symbols are placed into the packet, all before the packet is sent.

The receiver transport protocol (1225) generates feedback to be sent to the sender transport protocol (1215). A possible receiver feedback information format is shown at the bottom of FIG. 13. As shown, a receiver transport protocol (1225) reports back for each FID (1350(1), 1350(2)), the corresponding highest SEQN received for that FID (1355(1), 1355(2)). In addition, the receiver transport protocol (1225) reports back for each active source block the SBN (1360(1), 1360(2)) of that source block together with the number of encoding symbols received so far for that source block (1365(1)), 1365 (2)).

Also, the receiver transport protocol (1225) reports back the source block number of the lowest active source block (1370). The lowest active source block number (1370) reported back by the receiver transport protocol (1225) generally increased by the receiver transport protocol (1225) when the current active source block with the lowest source block number is considered recoverable with sufficient certainty by the receiver transport protocol (1225) and no further encoding symbols are needed for the current source block, and thus this source block is designated as inactive by the receiver transport protocol (1225). It is also possible that, in circumstances when not enough encoding symbols are received in a timely enough manner, that the receiver transport protocol (1225) increases the lowest active source block number (1370) even when there are source blocks with lower source block numbers that have not yet been recovered by the receiver transport protocol.

In should be apparent upon reading this disclosure that other variations are possible. The system may be augmented to allow the sender transport protocol (1215) to signal the lowest active source block number in the sender multipath data packet format as shown at the top of FIG. 13. For example, an additional parameter "lowest active source block number" may be added to the multipath data packet format as shown at the top of FIG. 13 to allow this signaling from the sender transport protocol (1215) to the receiver transport protocol (1225). This functionality then allows the sender transport protocol (1215) to signal skipping over source blocks for which it might not be possible to complete the sending and recovery of those source blocks in a way that would meet the end-to-end latency requirements of the system.

There are many variants of the above. For example, a byte range can be used instead of the ESI to indicate what source data is carried in the packet payloads. As another example, the byte range of the block within the entire stream of data can be used instead of the SBN and SBL to indicate what source data is used to generate any FEC data that is sent in the packet payload, in conjunction with an ESI to indicate what particular data is sent in the packet payload. As another variant, encoding symbols from different blocks may included within the same data packet, and multiple triples of SBN, SBL and ESI (or their equivalents) can be included in the packet header to identify the encoding symbols carried in the data packet. For example, the proportion of symbols carried in a packet for each active source block may be chosen to be proportional to the number of symbols that can be currently sent for each such source block, i.e., the proportion of symbols in the packet to be sent for active block i is chosen to be proportional to the current value of $L\_i+X\_i-U\_i$.

Figure 14:
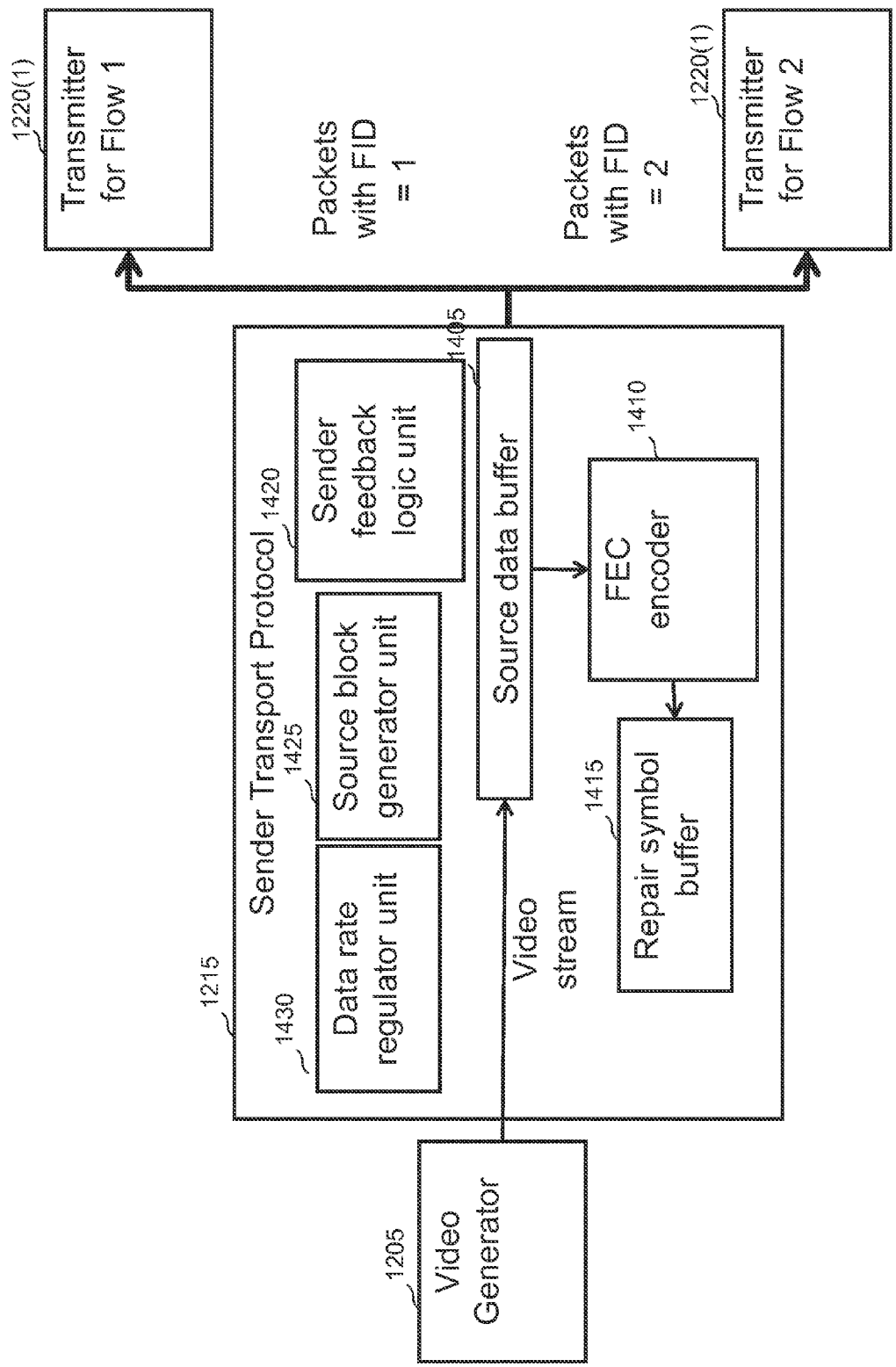
FIG. 14 is a block diagram of a multipath streaming sender.

FIG. 14 shows in some more detail a block diagram of the multipath streaming sender. Any or all of the sender end systems 100 of FIG. 1 may include components similar to the multipath streaming sender of FIG. 14. The video stream (1210) generated by the video generator (1205) is stored temporarily within the source data buffer (1405) within the sender transport protocol (1215), as shown in FIG. 14. The FEC encoder (1410) generates FEC repair symbols for source blocks that are already formed and places the resulting FEC repair symbols into a repair symbol buffer (1415) until they are needed for transmission. The FEC encoder (1410) can operate on an as-needed basis, generating repair symbols for active source blocks when they are needed for transmission. Alternatively, the FEC encoder (1410) can pre-generate a number of repair symbols for active source blocks so that they are ready to be sent as soon as needed, and also to reduce the overhead of calls to the FEC encoder (1410).

The triggering of the FEC encoder (1410) to generate additional repair symbols for a source block can be triggered by a signal from the sender feedback logic unit (1420) that determines which additional encoding symbols to send each time it is possible to send an additional encoding symbol. Thus, these steps represent examples of steps of a method including calculating a number of additional encoding units needed for the block to the server device, and sending data representing the number of additional encoding units to a sending device, such as a server device.

A source block is considered to be closed when both its beginning boundary and ending boundary have been determined, i.e., the scope of the data within the source block has been determined when the source block is closed, and it has a beginning byte index and an ending byte index within the context of the video stream of data. For example, a first source block might start at byte index 0 within the video data stream, and end at byte index 4,432, in which case there are 4,432 bytes of data within the source block that comprise the byte indices at indices 0 through 4,431. Continuing this example, the second source block starts at byte index 4,432, but its ending byte index may not be determined until some later point in time by the source block generator unit (1425), and until the ending byte index for the second source block has been determined the second source block is considered to be open.

Thus, in general, the video data stream can be thought of as a sequence of closed source blocks followed by at most one open source block that is in the process of being determined. Furthermore, the sequence of source blocks comprises zero or more inactive source blocks followed by one or more active source blocks (except at the end of delivery when the entire video stream has been successfully delivered), wherein inactive source blocks are those that have been successfully delivered to the receiver transport protocol (1225) and acknowledged to having been successfully delivered to the sender transport protocol (1215) based on feedback sent from the receiver transport protocol (1225), or are those source blocks that have been deemed too late to deliver and are thus are no longer required to be recovered at a receiver. The source block generator unit (1425) determines when to close the latest active source block and thereby start a new active open source block. When systematic FEC codes are used, i.e., when the source symbols of a source block are among the encoding symbols that can be used to recover the source block by an FEC decoder, then it is possible and preferable to allow sending of encoding symbols, specifically source symbols, for the active open source block.

Many well-known FEC codes are systematic, e.g., Reed-Solomon codes as specified in IETF RFC 5510, or the RaptorQ codes as specified in IETF RFC 6330, or the Raptor codes specified in IETF RFC 5053. Sending source symbols for the active open source block is preferable because this can reduce the end-to-end latency of the delivery of the video stream as well as provide higher quality and reliability delivery within the same end-to-end latency budget. One reason there is an advantage is because the delivery of the source block can commence even before the entire source block is available or its size is known. Once the active open source block is closed by the source block generator unit (1425) then repair symbols for this source block can be generated by the FEC encoder (1410) and stored in the repair symbol buffer (1415) and can be transmitted when additional encoding symbols for this source block are to be sent in accordance with the sender feedback logic unit (1420) methods.

Figure 16:
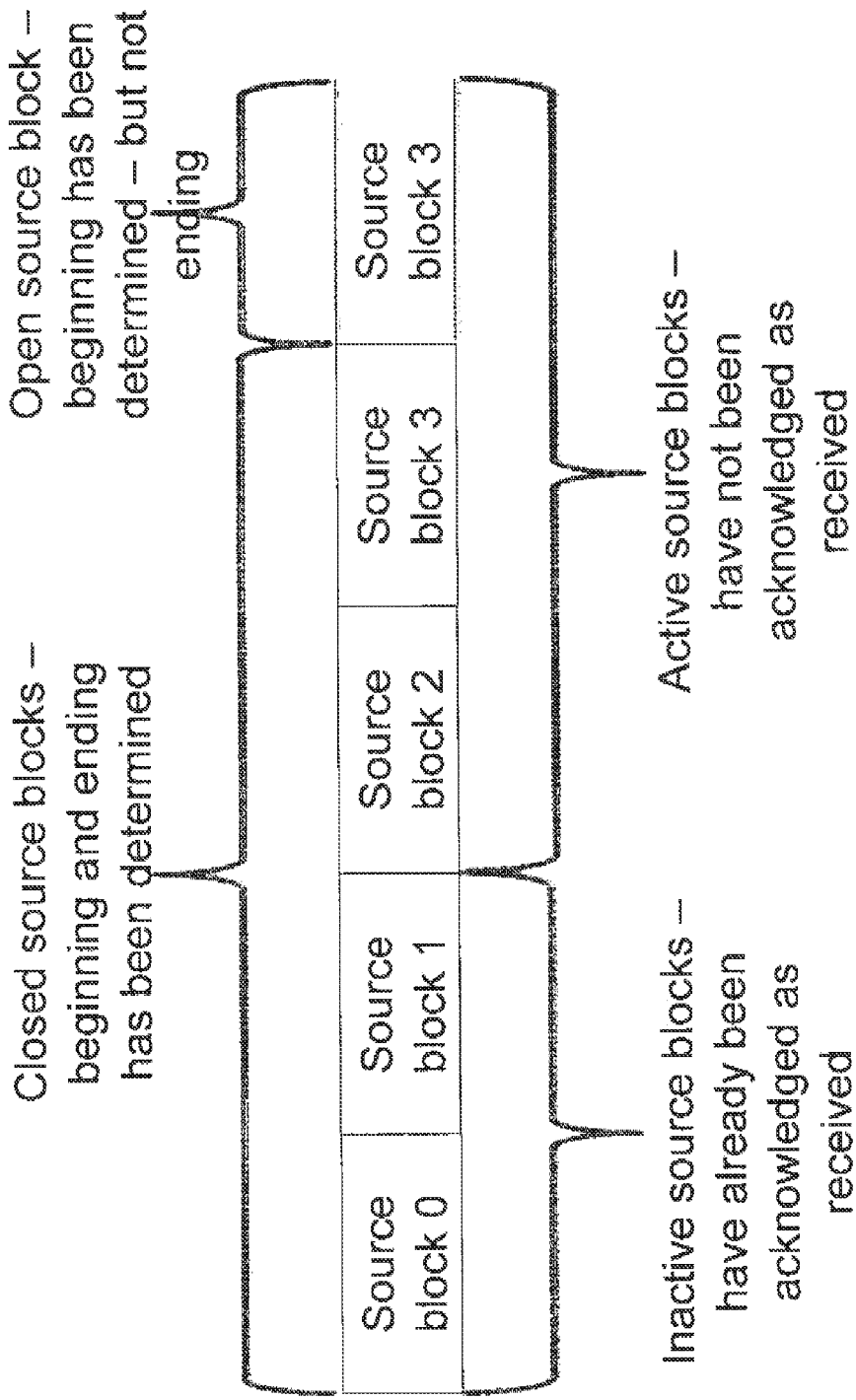
FIG. 16 depicts a snapshot of the different classifications of source blocks during the operation of the multipath FEC-based reliability transport control method.

Alternatively, there may be no repair symbol buffer (1415), and the FEC encoder (1410) can generate repair symbols on-the-fly for immediate transmission when additional encoding symbols for this source block are to be sent in accordance with the sender feedback logic unit (1420) methods. FIG. 16 depicts inactive and active source blocks, as well as closed source blocks (a mixture of inactive and active source blocks) and the at most one open source block (which is active).

The source block generator unit (1425) can use various methods to determine when to close the current active open source block and start the next active open source block. For example, the source block generator unit (1425) can decide to close the current active open source block when it receives information from the sender feedback logic unit (1420) that it has received feedback from the receiver feedback logic unit (1525) that indicates a packet has been received that was sent at or after the point in time that the first packet containing encoding symbols for the current active open source block was sent. This point in time can be determined by the sender feedback logic unit (1420) by recording the current sequence number for each of the flows at the time when the first packet containing encoding symbols from the current active open source block is sent, and then determining that the indication to the source block generator unit (1425) is to be provided as soon as the sender feedback logic unit (1420) receives feedback from the receiver feedback logic unit (1525) with the highest sequence number for a flow at least as high as the current sequence number for that flow at the time of the recording.

Using this method, the size of the current active open source block when it is closed and the size of the source block is determined is approximately an RTT amount of data. Alternatively, the source block generator unit (1425) can determine to close the current active open source block after a fixed amount of time, e.g., one second after the previous source block was closed. In this case, if the sending rate is variable then it is likely that each source block will be of a different size, whereas if the sending rate is constant then it is likely that source blocks will be of approximately equal size. As another alternative, the current active open source block can be closed by the source block generator unit (1425) as soon as the size of the open source block reaches a predetermined size, e.g., 100,000 bytes.

As other alternatives, the source block generator unit (1425) may use combinations of the above methods to close the current active open source block, for example closing the source block as soon as its size has reached a pre-determined size or until a pre-determined amount of time has passed since the previous source block was closed, whichever occurs first. As another example, the source block generator unit (1425) can close the current active open source block when an indication of feedback for that source block is first indicated to the source block generator unit (1425) from the sender feedback logic unit (1420), or after a fixed amount of time has passed since the closing of the previous source block, whichever occurs first.

Figure 15:
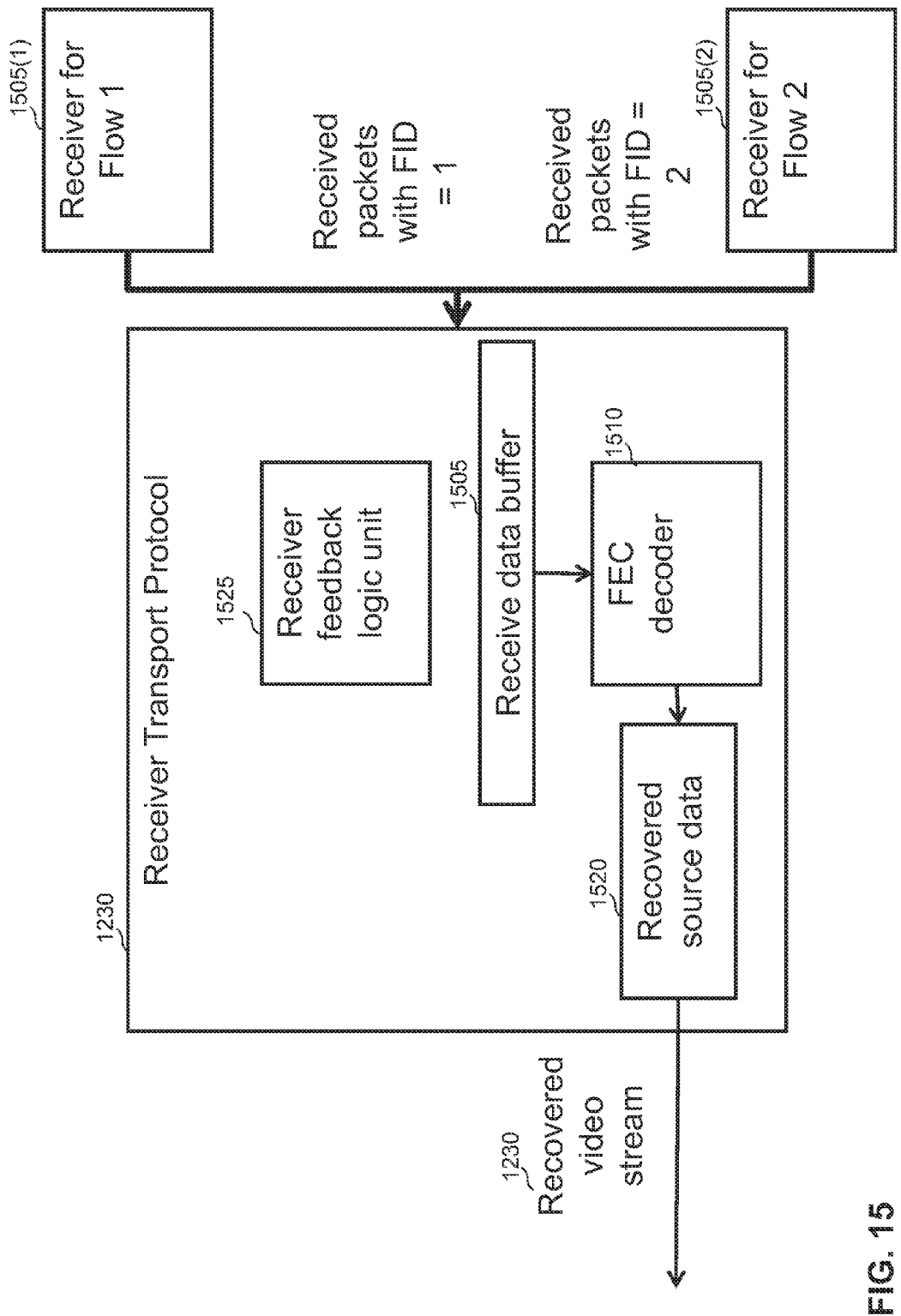
FIG. 15 is a block diagram of a multipath streaming receiver.

The sender feedback logic unit (1420) of FIG. 14 handles the feedback received from the receiver feedback logic unit (1525) of FIG. 15, which is provided in the format shown in the bottom of FIG. 13. The sender feedback logic unit (1420) updates the set of active source blocks based on the received lowest active SBN (1370). The sender feedback logic unit (1420) determines when to send the next data packet for the video stream, to which path flow to send the next data packet, and from which active source block (or multiple source blocks) to send the encoding symbols within the data packet.

The sender feedback logic unit (1420) can determine which active source block to send the next encoding symbol from as follows.

Using similar notation to that used previously, for each active source block with SBN=I, let BI be the number of encoding symbols that need to be received to recover source block I with some desired level of certainty. For example, using a Reed-Solomon FEC code, for example as described in IETF RFC 5510, the value of BI can be equal to the number of source symbols of the source block and the recovery of the entire source block is with complete certainty, whereas for other codes the value of BI may be equal to the number of source symbols of the source block with almost certainty and larger values of BI allow improved certainty, e.g., the RaptorQ codes described in IETF RFC 6330.

The sender feedback logic unit (1420) can calculate a value for BI based on the properties of the FEC code in use and on the number of source symbols in source block I. The sender feedback logic unit (1420) can calculate RI as the highest value of the number of encoding symbols received (1365) that the sender feedback logic unit (1420) has received from the receiver feedback logic unit (1525) for source block I. The sender feedback logic unit (1420) can calculate LI=BI−RI, which is the number of additional encoding symbols that the receiver must receive in addition to the number that the sender knows have been received by the receiver in order to recover source block I with some specified level of certainty.

Let UI be the number of encoding symbols that have been sent for source block I but for which no acknowledgement has yet been received at the sender from the receiver. The sender feedback logic unit (1420) can calculate UI based on feedback received from the receiver feedback logic unit (1525) as follows. The sender feedback logic unit (1420) can determine, for each flow ID value J, the number of encoding symbols sent for source block I in the range of sequence numbers for FID=J between the current sequence number C that is being sent for FID=J by the sender down to the highest sequence number S for FID=J that the sender feedback logic unit (1420) has received from the receiver feedback logic unit (1525) in the feedback information format shown at the bottom of FIG. 13. The sender feedback logic unit (1420) can make this calculation by saving, for each sequence number K in the range from S to C for FID=J, how many encoding symbols for source block I were carried in the packet with FID=J and sequence number K.

Based on this, the sender feedback logic unit (1420) can sum the number of such encoding symbols for source block I were sent to the path flow J within the range of sequence numbers S+1 through C−1. Then, the sender feedback logic unit (1420) can sum these quantities over the different path flows to determine how many encoding symbols UI in total have been sent but not yet acknowledged for source block I. Note that the information provided in data packets and in the feedback information using flow identifiers and flow sequence numbers for each flow or path and the methods described herein allows the sender to accurately calculate the number of sent but not yet acknowledged (either lost or received) encoding symbols for each path, and thus allows the sender to accurately estimate the aggregate number of sent but not yet acknowledged encoding symbols over all paths. The sender estimate accuracy is high if there is little difference between the order that packets are sent to a path and the order that packet are received (if not lost) from the path, which is generally the case. As mentioned previously, the aggregate sending and receiving order of packets sent over multiple paths, not taking into account over which path the packets are sent, can be quite different. Thus, one of the benefits of providing and using per path information and feedback is to allow the sender to estimate more accurately how much data in aggregate to send to minimize sending redundant data and to minimize end to end latency of recovery of blocks of the stream. Thus, the data received by the sender feedback logic represents an example of tracking and reporting and using path specific information when data is to be reliably streamed over a plurality of parallel network paths that can experience packet loss and varying data throughputs and path latencies.

As before, let XI be the number of encoding symbols that the sender feedback logic unit (1420) has determined can be sent proactively for source block I. The sender can calculate the value of XI based on specified rules, e.g., XI is some fixed fraction of BI, e.g., XI=0.05*BI, or other rules similar to those described previously. Then, the sender feedback logic unit (1420) determines that another encoding symbol can be sent for an active closed source block I if LI+XI−UI>0.

The data rate regulator unit (1430) determines for each flow when a next data packet can be sent to that flow. The data rate regulator unit (1430) communicates with each transmitter (1220(1)), 1220(2), etc.) to make this determination. If for example UDP data packets are transmitted, a transmitter (1220(1)) can determine the size of its UDP send queue with the TIOCOUTQ ioctl( )if Linux or some other Unix-like operating system is used. By monitoring the send queue size the transmitter (1220(1)) can avoid excess buffering in the transmitter (1220(1)), and only ever queue new output packets when the transmitter (1220(1)) internal sender queue is low, thus avoiding that the transmitter (1220(1)) accumulates too much data that has not been sent. If the transmitter (1220(1)) send queue is kept non-empty, but small, full sending throughput can be achieved. Thus, each transmitter (1220(1)) for each flow indicates to the data rate regulator unit (1430) when it can accept another data packet for transmission, at which point the data rate regulator unit (1430) determines that a data packet can be sent to the flow associated with that transmitter (1220(1)). The data rate regulator unit (1430) receives indications from each of the possible transmitters (1220(1), 1220(2), etc.) and using the above method, can determine for each possible flow when the next data packet for that flow can be sent.

Alternatively, or in addition, a transmitter (1220(1)) can set the sender window size to a sufficiently small value using the SO_SNDBUF value. It can then wait for the UDP socket to be writable for example by using the select( )or poll( )system calls, to determine when it is possible to send another data packet for the flow associated with the transmitter (1220(1)). This way, the size of the transmitter sender queue does not have to be constantly polled.

All the transmitters (1220(1), 1220(2), etc.) might be in communication with the data rate regulator unit (1430) that determines which data packets to send to each transmitter (1220(1), 1220(2), etc.) when a transmitter had indicated that has the capacity to send another data packet to a flow associated with the transmitter. The communication between transmitters (1220(1), 1220(2), etc.) and the data rate regulator unit (1430) may be happening on a local network with high bandwidth, low latency, and low packet loss, and therefore it might be entirely satisfactory if the communication uses TCP. In such a setting, a transmitter then runs in the following loop:

Repeat indefinitely:

1. Wait until the transmitter send queue is low (either by monitoring TIOCOUTQ) or by using a low send buffer, and select( ), as explained above, or both.
2. Send a request for a new packet to the data rate regulator unit (1430). (For example, send( ) or write( ) to the data rate regulator unit (1430))
3. Wait for a response from the data rate regulator unit (1430), including the data packet to send. (For example, use select( ))
4. Send the data packet over UDP to the network (1222) (e.g., by using the send( ) or write( ) system call)

The data rate regulator unit (1430) does the following:

Repeat indefinitely:

1. Wait for a request from any transmitter (using, e.g., select( )
2. For each transmitter that requested a new data packet to send, construct a new data packet to send, and provide it to the transmitter.

The data rate regulator unit (1430) can also provide information to the video generator (1205) to increase the video stream data rate being generate, decrease the video stream data rate being generated, or keep the video data rate the same, wherein this information can be based for example of the amount of data in the source data buffer (1405), and the rate at which the data rate regulator unit (1430) is sending data packets in aggregate along different flows.

The sender feedback logic unit (1420) determines that another encoding symbol can be sent for the active open source block I if there is at least one source symbol of source block I that is available to be sent that has not yet been sent. The sender feedback logic unit (1420) performs all of the calculations above using all the feedback and transmission information available logically at the time when the data rate regulator unit (1430) indicates that the next data packet carrying encoding symbols is to be sent (although the sender feedback logic unit (1420) may make some or all of the calculations at any point prior to the time that the next data packet is to be sent). When the data rate regulator unit (1430) indicates that the next data packet is to be sent to a particular flow, the sender feedback logic unit (1420) determines the active source block I such that I is the lowest source block number amongst all active source blocks for which encoding symbols can be sent at that time as determined as described above by the sender feedback logic unit (1420), and then one or more encoding symbols for source block I are placed into that next data packet and it is sent to that flow.

Any or all of the various logical blocks in FIG. 14 may be implemented in hardware, software, firmware, or a combination thereof. When implemented in software or firmware, it is to be understood that requisite hardware may also be provided, such as one or more computer-readable media include instructions for performing the described functionality, and one or more processing units for executing the instructions.

In this manner, FIG. 14 represents an example of a device including one or more processors configured to send a first encoding unit for a first block over a first path of the parallel network paths, after sending the first encoding unit, send a second encoding unit for a second block over the first path, and after sending the second encoding unit, send a third encoding unit for the first block over the first path.

FIG. 15 is a block diagram illustrating in greater detail an example multipath streaming receiver. Any or all of the receiving end systems 160 of FIG. 1 may include components similar to multipath streaming receiver of FIG. 15. Packets sent by a transmitter for flow 1 (1220(1)) are received (if they are not lost between transmission and reception) by the corresponding receiver for flow 1 (1505(1)), and similarly for the other flows. All received packets are aggregated by the receiver transport protocol (1225) into a receive data buffer (1505). The FEC decoder (1510) is executed to recover active source blocks for which enough encoding symbols have been received to recover the source block, and the recovered source blocks are placed into the recovered source data buffer (1520), preferable in order of increasing source block number so that the recovered video stream (1230) is in the same order as the original video stream (1210).

The receiver feedback logic unit (1525) monitors the received packets in the receive data buffer (1505) and generates feedback information, for example in the format shown in the bottom of FIG. 13, that is sent to the corresponding sender feedback logic unit (1420). The receiver feedback logic unit (1525) can also determine when a source block can be recovered, based on the maximum SBL (1318) values received amongst all the data packets received for that source block and also possibly based on the SBL flag indicating whether or not the source block is open or closed, and thus the receiver feedback logic unit (1525) can invoke the FEC decoder (1510) when it is determined that a source block can be recovered. Generally, it is preferable that the receiver feedback logic unit (1525) not declare a source block to be recoverable if the receiver feedback logic unit has not received an indication that the source block is closed, for example as determined by the SBL flag, if present, indicating that the source block is closed, or by receiving packets carrying repair symbols for the source block which provides an implicit indication that the source block is closed.

When a source block can be recovered, or when a source block is to be skipped for example due to end-to-end time constraints, the receiver feedback logic unit (1525) can reset the lowest active SBN (1370) in the feedback information provided to the sender feedback logic unit (1420) to an appropriately higher SBN value. The receiver feedback logic unit (1525) determines for each active source block, the number of received encoding symbols for that source block. The receiver feedback logic unit (1525) determines, for each flow, the highest sequence number received for that flow. All of this information is sent from the receiver feedback logic unit (1525) to the sender feedback logic unit (1420) on a continuous basis, using for example the receiver multipath feedback information format provided at the bottom of FIG. 13.

Any or all of the various logical blocks in FIG. 15 may be implemented in hardware, software, firmware, or a combination thereof. When implemented in software or firmware, it is to be understood that requisite hardware may also be provided, such as one or more computer-readable media include instructions for performing the described functionality, and one or more processing units for executing the instructions.

In this manner, FIG. 15 represents an example of a device including one or more processors configured to receive a first encoding unit for a first block over a first path of the parallel network paths, after receiving the first encoding unit, receive a second encoding unit for a second block over the first path, and after receiving the second encoding unit, receive a third encoding unit for the first block over the first path.

In this manner, FIG. 15 represents an example of a device including one or more processors configured to receive, from a server device, forward-error corrected data via a plurality of parallel network paths, determine losses of the data over each of the network paths, and send data representing the losses of the data over each of the network paths to the server device.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A computer-readable storage medium having stored thereon instructions that, when executed by a processor of a client device, cause the processor to:
    receive, from a server device, forward-error corrected data via a plurality of parallel network paths, wherein the received data comprises a number of encoding units for a block of data, wherein the instructions that cause the processor to receive the forward-error corrected data comprise instructions that cause the processor to execute a transport protocol including an interleaved reliability control protocol that is independent of a rate control protocol of the transport protocol, and wherein the transport protocol is distinct from transmission control protocol (TCP) and does not include TCP;
    determine losses of the data over each of the network paths;
    send data representing an aggregation of the losses of the data over each of the network paths to the server device;
    receive one or more additional encoding units for the block of data based on the data representing the aggregation of the losses of the data over each of the network paths; and
    recover the block from the received encoding units using forward-error correction.

2. The computer-readable storage medium of claim 1, wherein the instructions that cause the processor to send the data representing the losses comprise instructions that cause the processor to send data identifying each of a plurality of blocks for which encoding units were received, numbers of encoding units needed for each of the blocks, and data defining highest sequence numbers received for network packets related to each of the blocks.

3. The computer-readable storage medium of claim 1, wherein the instructions that cause the processor to send the data representing the losses comprise instructions that cause the processor to send, for each of the parallel network paths, data identifying a highest sequence number received for a packet flow received via the respective parallel network path.

4. The computer-readable storage medium of claim 1, further comprising instructions that cause the processor to:
    calculate a number of additional encoding units needed for the block to the server device; and
    send data representing the number of additional encoding units to the server device.

5. The computer-readable storage medium of claim 4, wherein the data representing the number of additional encoding units comprises the data representing the losses of the data over each of the network paths.

6. The computer-readable storage medium of claim 4, wherein the instructions that cause the processor to calculate the number of additional encoding units comprises instructions that cause the processor to:
    calculate a number of encoding units needed to recover the block based on a size of the block and sizes of the received encoding units for the block; and
    calculate the number of additional encoding units as the difference between the number of encoding units needed to recover the block and the number of received encoding units.

7. The computer-readable storage medium of claim 1, further comprising instructions that cause the processor to:
    receive an encoding unit for the block;
    determine whether the block is active;
    when the block is not active, discard the encoding unit; and
    when the block is active, add the encoding unit to a set of encoding units for the block to be used to recover the block.

8. The computer-readable storage medium of claim 1, wherein the instructions that cause the processor to receive comprise instructions that cause the processor to receive encoding units for a plurality of blocks such that the encoding units for the plurality of blocks are interleaved with each other.

9. The computer-readable storage medium of claim 8, wherein the instructions that cause the processor to receive the encoding units comprise instructions that cause the processor to:
    receive a first encoding unit for a first block over a first path of the parallel network paths;
    after receiving the first encoding unit, receive a second encoding unit for a second block over the first path; and
    after receiving the second encoding unit, receive a third encoding unit for the first block over the first path.

10. A computer-readable storage medium having stored thereon instructions that, when executed by a processor of a server device, cause the processor to:
    send, to a client device, forward-error corrected data via a plurality of parallel network paths, wherein the sent data comprises a number of encoding units for a block of data, wherein the instructions that cause the processor to send the forward-error corrected data comprise instructions that cause the processor to execute a transport protocol including an interleaved reliability control protocol that is independent of a rate control protocol of the transport protocol, and wherein the transport protocol is distinct from transmission control protocol (TCP) and does not include TCP;
    receive, from the client device, data representing an aggregation of losses of the data sent over each of the network paths;
    modify, based on the data representing the losses, an amount of forward-error correction data sent for subsequent data transmissions over the parallel network paths; and
    send one or more additional encoding units for the block of data based on the data representing the aggregation of the losses of the data over each of the network paths.

11. The computer-readable storage medium of claim 10, wherein the instructions that cause the processor to receive the data representing the losses comprise instructions that cause the processor to receive, for each of the parallel network paths, data identifying a highest sequence number received for a packet flow sent via the respective parallel network path.

12. The computer-readable storage medium of claim 10, wherein the instructions that cause the processor to receive the data representing the losses comprise instructions that cause the processor to receive data identifying each of a plurality of blocks for which encoding units were received by the client device, numbers of encoding units needed for each of the blocks, and data defining highest sequence numbers received by the client device for network packets related to each of the blocks.

13. The computer-readable storage medium of claim 10, further comprising instructions that cause the processor to:
    receive, from the client device, data representing a number of additional encoding units needed for the block; and send the number of additional encoding units for the block to the client device.

14. The computer-readable storage medium of claim 13, wherein the data representing the number of additional encoding units comprises the data representing the losses of the data sent over each of the network paths.

15. The computer-readable storage medium of claim 10, further comprising instructions that cause the processor to:
receive, from the client device, data representing a number of received encoding units;
calculate a number of encoding units needed to recover the block based on a size of the block and sizes of the received encoding units for the block;
calculate a number of additional encoding units as the difference between the number of encoding units needed to recover the block and the number of received encoding units; and
send the number of additional encoding units to the client device.

16. The computer-readable storage medium of claim 10, wherein the instructions that cause the processor to send comprise instructions that cause the processor to send encoding units for a plurality of blocks such that the encoding units for the plurality of blocks are interleaved with each other.

17. The computer-readable storage medium of claim 16, wherein the instructions that cause the processor to send the encoding units comprise instructions that cause the processor to:
send a first encoding unit for a first block over a first path of the parallel network paths;
after sending the first encoding unit, send a second encoding unit for a second block over the first path; and
after sending the second encoding unit, send a third encoding unit for the first block over the first path.

18. The computer-readable storage medium of claim 10, further comprising instructions that cause the processor to send the encoding units for the block of data before the entire block of data is available to the processor.

19. The computer-readable storage medium of claim 10, further comprising instructions that cause the processor to:
send a first set of encoding units for a first block, wherein the first set of encoding units includes fewer than a minimum number of encoding units needed to recover the first block;
after sending the first set of encoding units, send a second set of encoding units for a second block; and
after sending the second set of encoding units, send a third set of encoding units including one or more encoding units for the first block.

20. The computer-readable storage medium of claim 19, wherein the instructions that cause the processor to send the first set of encoding units comprise instructions that cause the processor to send the first set of encoding units before the first block is fully formed.

21. The computer-readable storage medium of claim 19, wherein the first block and the second block comprise blocks of a plurality of blocks of data for media content, wherein the instructions that cause the processor to send the first set of encoding units, the second set of encoding units, and the third set of encoding units comprise instructions that cause the processor to send the first set of encoding units, the second set of encoding units, and the third set of encoding units via a path of a plurality of parallel network paths over which the plurality of blocks of data are sent.

22. The computer-readable storage medium of claim 21, further comprising instructions that cause the processor to:
receive data representing losses of the data over each of the network paths from the client device.

23. The computer-readable storage medium of claim 19, further comprising instructions that cause the processor to:
receive a first set of feedback data after receiving the first set of encoding units, wherein the first set of feedback data includes data identifying the first block, data indicating a number of needed encoding units to recover the first block, and data defining a highest sequence number received for network packets related to the first block; and
receive a second set of feedback data after receiving the second set of encoding units, wherein the second set of feedback data includes data identifying the second block, data indicating a number of needed encoding units to recover the second block, and data defining a highest sequence number received for network packets related to the second block.

* * * * *